United States Patent
Kimberg et al.

(10) Patent No.: US 10,373,154 B2
(45) Date of Patent: Aug. 6, 2019

(54) APPARATUS, METHOD, AND COMPUTER PROGRAM PRODUCT FOR SETTLEMENT TO A MERCHANT'S CARD ACCOUNT USING AN ON-LINE BILL PAYMENT PLATFORM

(71) Applicant: MasterCard International Incorporated, Purchase, NY (US)

(72) Inventors: Deborah M. Kimberg, Chesterfield, MO (US); Derek Reed, O Fallon, MO (US); Lisa Sims, Saint Charles, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 804 days.

(21) Appl. No.: 14/707,807

(22) Filed: May 8, 2015

(65) Prior Publication Data
US 2015/0332228 A1 Nov. 19, 2015

Related U.S. Application Data

(60) Provisional application No. 62/000,242, filed on May 19, 2014.

(51) Int. Cl.
*G06Q 20/34* (2012.01)
*G06Q 20/10* (2012.01)

(52) U.S. Cl.
CPC ........... *G06Q 20/34* (2013.01); *G06Q 20/102* (2013.01); *G06Q 20/108* (2013.01)

(58) Field of Classification Search
CPC ..... G06Q 20/34; G06Q 10/102; G06Q 20/108
(Continued)

(56) References Cited

U.S. PATENT DOCUMENTS

| | | | |
|---|---|---|---|
| 5,699,528 A | 12/1997 | Hogan | |
| 6,285,991 B1 * | 9/2001 | Powar | G06Q 20/04 705/40 |

(Continued)

OTHER PUBLICATIONS

MasterCard International Incorporated, MoneySend—API—MasterCard Developer Zone, downloaded from https://developer.mastercard.com/portal/display/api/MoneySend on May 6, 2014, pp. 1-3.

(Continued)

*Primary Examiner* — Robert R Niquette
*Assistant Examiner* — Liz P Nguyen
(74) *Attorney, Agent, or Firm* — Otterstedt, Wallace & Kammer, LLP

(57) ABSTRACT

Registration information is obtained for a plurality of businesses, including the business name and a payment card account number for a payment card account in which the given business can receive payments from customers via a special payment transaction over a payment card network. An electronic bill payment system instruction including at least an amount and a unique biller identifier is obtained. A biller directory, including the registration information and the unique biller identifiers, is accessed based on the unique biller identifiers in the instruction, to retrieve the payment card account number. A payment is initiated to the business via the special payment transaction over the payment card network, based on the retrieved payment card account number.

18 Claims, 14 Drawing Sheets

(58) Field of Classification Search
USPC .......................................................... 705/40
See application file for complete search history.

(56) References Cited

U.S. PATENT DOCUMENTS

| | | | |
|---|---|---|---|
| 6,636,833 | B1 | 10/2003 | Flitcroft |
| 7,136,835 | B1 | 11/2006 | Flitcroft |
| 2001/0037295 | A1 | 11/2001 | Olsen |
| 2002/0111919 | A1* | 8/2002 | Weller .................... G06Q 20/02 705/67 |
| 2009/0076950 | A1 | 3/2009 | Chang et al. |
| 2010/0100480 | A1 | 4/2010 | Altman |
| 2011/0251952 | A1 | 10/2011 | Kelly |
| 2012/0197788 | A1 | 8/2012 | Sanghvi |
| 2013/0290177 | A1 | 10/2013 | Milam |
| 2013/0311362 | A1 | 11/2013 | Milam |
| 2014/0067620 | A1 | 3/2014 | Blinov |
| 2014/0074705 | A1 | 3/2014 | Kimberg |
| 2014/0101038 | A1 | 4/2014 | Ganesan |
| 2015/0066753 | A1 | 3/2015 | Hall |

OTHER PUBLICATIONS

Wikipedia, QR code, downloaded from http://en.wikipedia.org/wiki/QR_code on May 6, 2014, pp. 1-14.

Garry Lyons, Simplify Commerce: Mobile or Online, it's Easy to Accept Payments, downloaded from https://newsroom.mastercard.com/2013/06/27/simplify-commerce-mobile-or-online-its-easy-to-accept-payments/on May 10, 2014, p. 1.

Mark Lulic, unpublished U.S. Appl. No. 14/310,061, Apparatus, Method, and Computer Program Product for Bus Rapid Transit Ticketing and the Like, Jun. 20, 2014, pp. 1-38 plus 6 sheets drawings.

Canadian Intellectual Property Office, Examiner Kazem Ziaie, Office Action dated Jul. 5, 2017, pp. 1-3, counterpart Canadian Patent Application 2,949,366.

IP Australia, Examiner Chirag Mehta, Office Action dated Jun. 23, 2017, pp. 1-3, counterpart Australian Patent Application 2015264512.

USPTO as IISA, Authorized Officer Lee W. Young, International Search Report and Written Opinion of the ISR for International Application PCT/US15/30951, pp. 1-9, Aug. 14, 2015.

* cited by examiner

US 10,373,154 B2

APPARATUS, METHOD, AND COMPUTER PROGRAM PRODUCT FOR SETTLEMENT TO A MERCHANT'S CARD ACCOUNT USING AN ON-LINE BILL PAYMENT PLATFORM

CROSS-REFERENCE TO RELATED APPLICATIONS

This patent application claims the benefit of U.S. Provisional Patent Application Ser. No. 62/000,242 filed on 19 May 2014 and entitled "APPARATUS, METHOD, AND COMPUTER PROGRAM PRODUCT FOR SETTLEMENT TO A MERCHANT'S CARD ACCOUNT USING AN ON-LINE BILL PAYMENT PLATFORM." The complete disclosure of the aforementioned U.S. Provisional Patent Application Ser. No. 62/000,242 including all appendices thereof is expressly incorporated herein by reference in its entirety for all purposes.

FIELD OF THE INVENTION

The present invention relates generally to the electronic and computer arts, and, more particularly, to electronic payment techniques.

BACKGROUND OF THE INVENTION

The use of payment cards, such as credit cards, debit cards, and pre-paid cards, has become ubiquitous. Most payment card accounts have one or more associated physical cards; however, the use of non-traditional payment devices, such as appropriately configured "smart" cellular telephones, is increasing.

The process of electronic bill presentment and payment has also been popular for quite some time. For example, U.S. Pat. No. 5,699,528 to Hogan (expressly incorporated herein by reference in its entirety for all purposes) discloses a system and method for bill delivery and payment over a communications network. In the bill delivery and payment system, users are able to access a server computer on a communications network to obtain bill information and pay bills.

US Patent Publication 2014-0067620 of Blinov (expressly incorporated herein by reference in its entirety for all purposes) discloses techniques for purchasing by crediting a merchant's card, in connection with an on-line purchase of goods.

SUMMARY OF THE INVENTION

Principles of the present invention provide techniques for settlement to a merchant's card account using an on-line bill payment platform.

In one aspect, an exemplary method includes the step of obtaining registration information for a plurality of businesses. The registration information includes, for each given one of the businesses, at least a name of the given one of the businesses and a payment card account number for a payment card account in which the given one of the businesses can receive payments from customers via a special payment transaction over a payment card network. A further step includes obtaining an electronic bill payment system instruction including at least an amount and a corresponding one of a plurality of previously-assigned unique biller identifiers. The electronic bill payment system instruction is based on a communication from one of the customers. The one of the customers is a customer of one of the plurality of businesses which has been assigned the corresponding one of the unique biller identifiers. Still further steps include accessing a biller directory including the registration information and the unique biller identifiers, based on the corresponding one of the unique biller identifiers in the electronic bill payment system instruction, to retrieve the payment card account number for the payment card account for the one of the plurality of businesses which has been assigned the corresponding one of the unique biller identifiers; and initiating a payment to the one of the plurality of businesses which has been assigned the corresponding one of the unique biller identifiers, for the amount, via the special payment transaction over the payment card network, to the payment card account for the one of the plurality of businesses which has been assigned the corresponding one of the unique biller identifiers, based on the retrieved payment card account number.

In another aspect, another exemplary method includes the step of obtaining registration information for a plurality of businesses. The registration information includes, for each given one of the businesses, at least a name of the given one of the businesses and a specification of a payment method by which the given one of the businesses desires to receive payments from customers. The payment method may be conventional or may be a special payment transaction over a payment card network. The registration information is obtained by an electronic bill payment system from a third party partner via a real-time application program interface. A further method step includes confirming registration of each given one of the plurality of businesses, from the electronic bill payment system, back to the third party partner, via the real-time application program interface.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the invention can provide substantial beneficial technical effects, as will be appreciated by the skilled artisan from the discussion herein.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Payment Devices and Associated Payment Processing Networks

Figure 1:
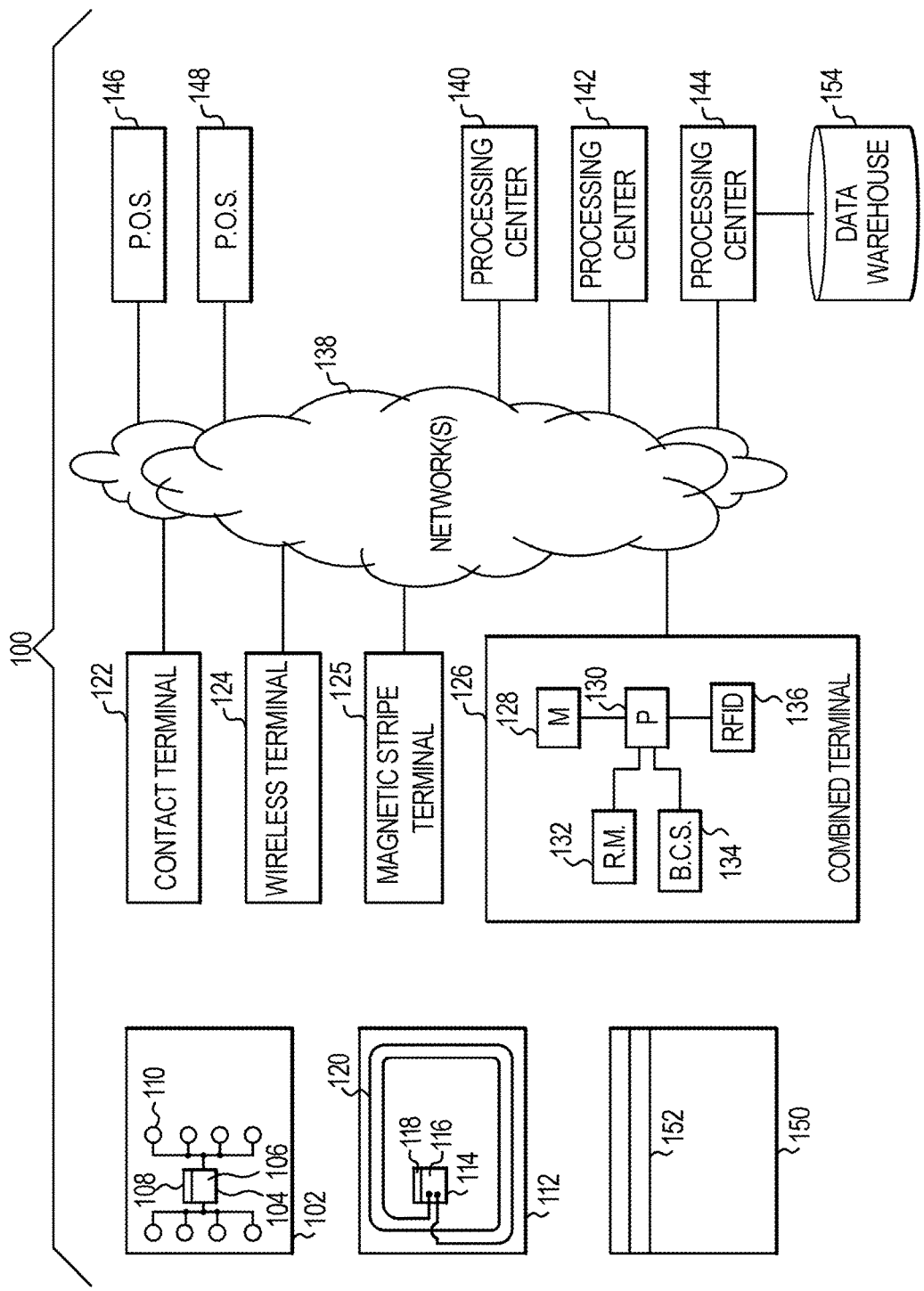
FIG. 1 shows an example of a system and various components thereof that can implement at least a portion of some techniques of the invention.

With regard to payment card and similar payments, attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 typically functions with other types of devices in lieu of or in addition to "smart" or "chip" cards 102, 112; for example, a conventional card 150 having a magnetic stripe 152. Furthermore, an appropriately configured mobile device (e.g., "smart" cellular telephone handset, tablet, personal digital assistant (PDA), and the like) can be used to carry out contactless payments in some instances. One non-limiting example of a new approach is the Apple Pay app, a mobile payment and digital wallet service from Apple Inc., Cupertino, Calif., US.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement some aspects or embodiments of the present invention is the MULTOS® operating system licensed by MAOSCO Limited. (MAOSCO Limited, St. Andrews House, The Links, Kelvin Close, Birchwood, Warrington, Wash.3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

The skilled artisan will also be familiar with the Master-Card® PayPass™ specifications, available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment or the like. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

It should be noted that the system depicted in FIG. 1 may involve not only conventional transactions at "brick and mortar" merchants, but also, card-not-present transactions, such as card-not-present Internet transactions or card-not-present recurring payments. In some instances, an Internet Protocol (IP) address may be captured during card-not-present Internet transactions. In exemplary card-not-present Internet transactions, an individual utilizes his or her home computer to communicate with a server of an e-commerce merchant over the Internet. The individual provides his or her PAN to the merchant's server. The merchant utilizes the PAN to initiate an authorization request, and upon receiving an authorization request response indicating approval, will complete the e-commerce transaction. In exemplary card-not-present recurring payments, an individual provides his or her PAN and related data to a merchant (e.g., via phone or postal mail). The merchant utilizes the PAN to initiate an authorization request, and upon receiving an authorization request response indicating approval, will complete the recurring transaction.

In some cases, there can be payment card accounts which do not have physical cards or other physical payment devices associated therewith; for example, a customer can be provided with a PAN, expiration date, and security code but no physical payment device, and use same, for example, for card-not-present telephone or internet transactions. In this regard, a "cardholder" should be understood to refer to the account holder of a payment card account, regardless of whether the holder actually has a physical payment card or other physical payment device.

Figure 2:
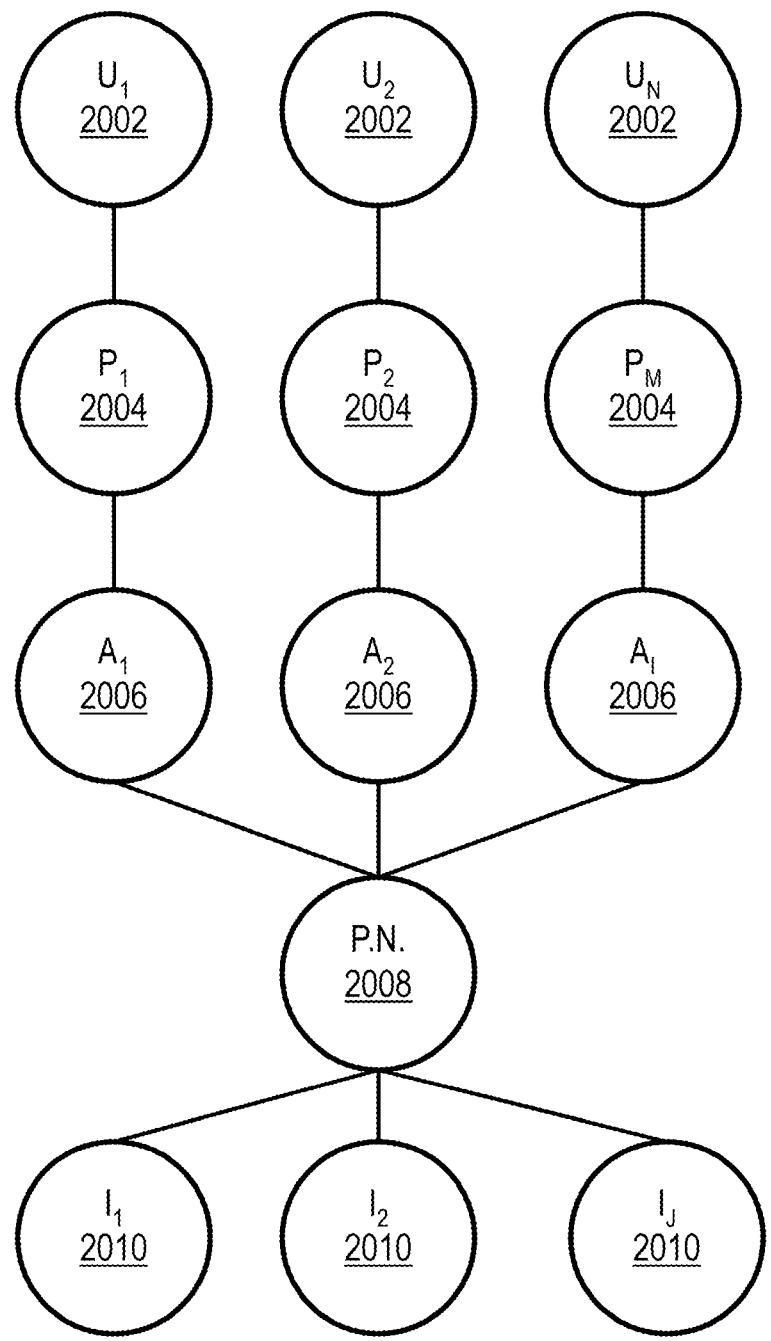
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers, useful in connection with one or more embodiments of the invention.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal. Note also that elements 2006, 2010 represent the entities that actually carry out processing for the acquirers and issuers respectively; in some instances, these entities carry out their own processing; in other entities, they utilize acquirer processors and issuer processors, respectively.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed in relation to payment card accounts using other kinds of payment networks, for example, proprietary or closed payments networks with only a single issuer and acquirer. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer are the same entity.

Messages within a network such as network 138 and/or network 2008, may, in at least some instances, conform to the International Organization for Standardization (ISO) Standard 8583, Financial transaction card originated messages—Interchange message specifications, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

ISO 8583:1993 (1993)

ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. The card accounts and/or account numbers may or may not have physical cards or other physical payment devices associated with them. For example, in some instances, organizations have purchasing or procurement card accounts to which a payment card account number is assigned, used for making purchases for the organization, but there is no corresponding physical card. In other instances, "virtual" account numbers are employed; this is also known as PAN mapping. The PAN mapping process involves taking the original Primary Account Number (PAN)(which may or may not be associated with a physical card) and issuing a pseudo-PAN (or virtual card number) in its place. Commercially available PAN-mapping solutions include those available from Orbiscom Ltd., Block 1, Blackrock Business Park, Carysfort Avenue, Blackrock, Co. Dublin, Ireland (now part of MasterCard International Incorporated of Purchase, N.Y., USA); by way of example and not limitation, techniques of U.S. Pat. No. 6,636,833 (expressly incorporated herein by reference in its entirety for all purposes) and U.S. Pat. No. 7,136,835 (expressly incorporated herein by reference in its entirety for all purposes) of Flitcroft et al.

Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network. One or more embodiments are applicable to many other different kinds of payment card networks as well; the AMERICAN EXPRESS® network and the DISCOVER® network are non-limiting examples.

While payment card networks have generally been used as described with regard to FIGS. 1 and 2, recently, MasterCard MONEYSEND (mark of MasterCard International Incorporated, Purchase, N.Y., US) money transfer services have provided a new dimension. A funding transaction moves money from the sender (customer) to the Originating Institution (the financial institution providing the money transfer service); that transaction can be initiated through a MONEYSEND application program interface (API). The sender can fund the transaction using a MasterCard card account or other branded card account that the Originating Institution accepts; from a bank account; or with cash. A Payment Transaction transfers funds from the Originating Institution, via the MasterCard Network (e.g., BANKNET), to the payment card account identified by the recipient at the Receiving Institution. Funds can be transferred to a MasterCard® card, Debit MasterCard® card, and the like (marks of MasterCard International Incorporated, Purchase, N.Y., US). Such transactions are discussed further below and are an example of what are more generally referred to herein as special payment transactions.

Figure 11:
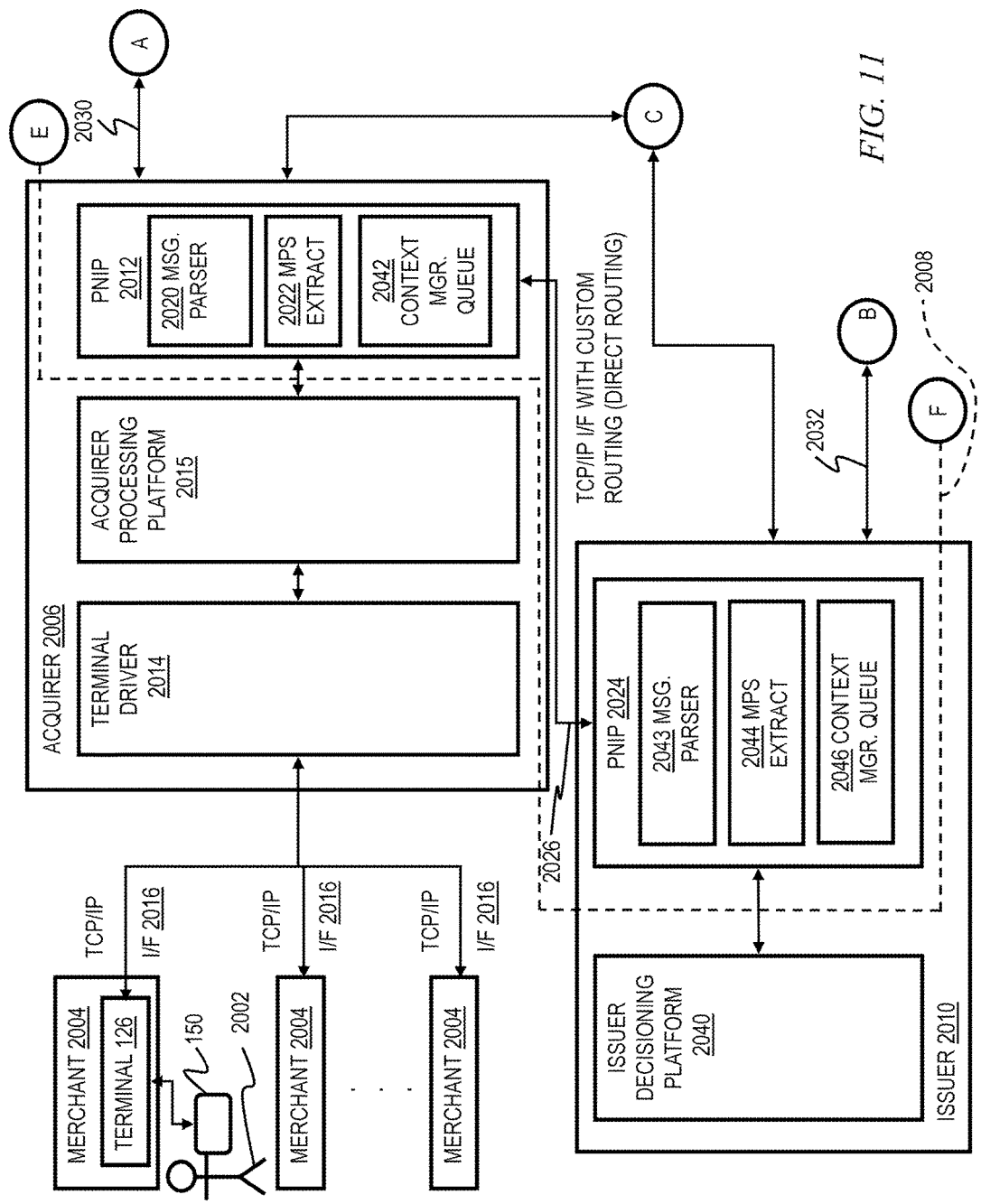
FIGS. 11 and 12 provide an exemplary detailed view of operation of a payment card network, in accordance with an aspect of the disclosure.
Figure 12:
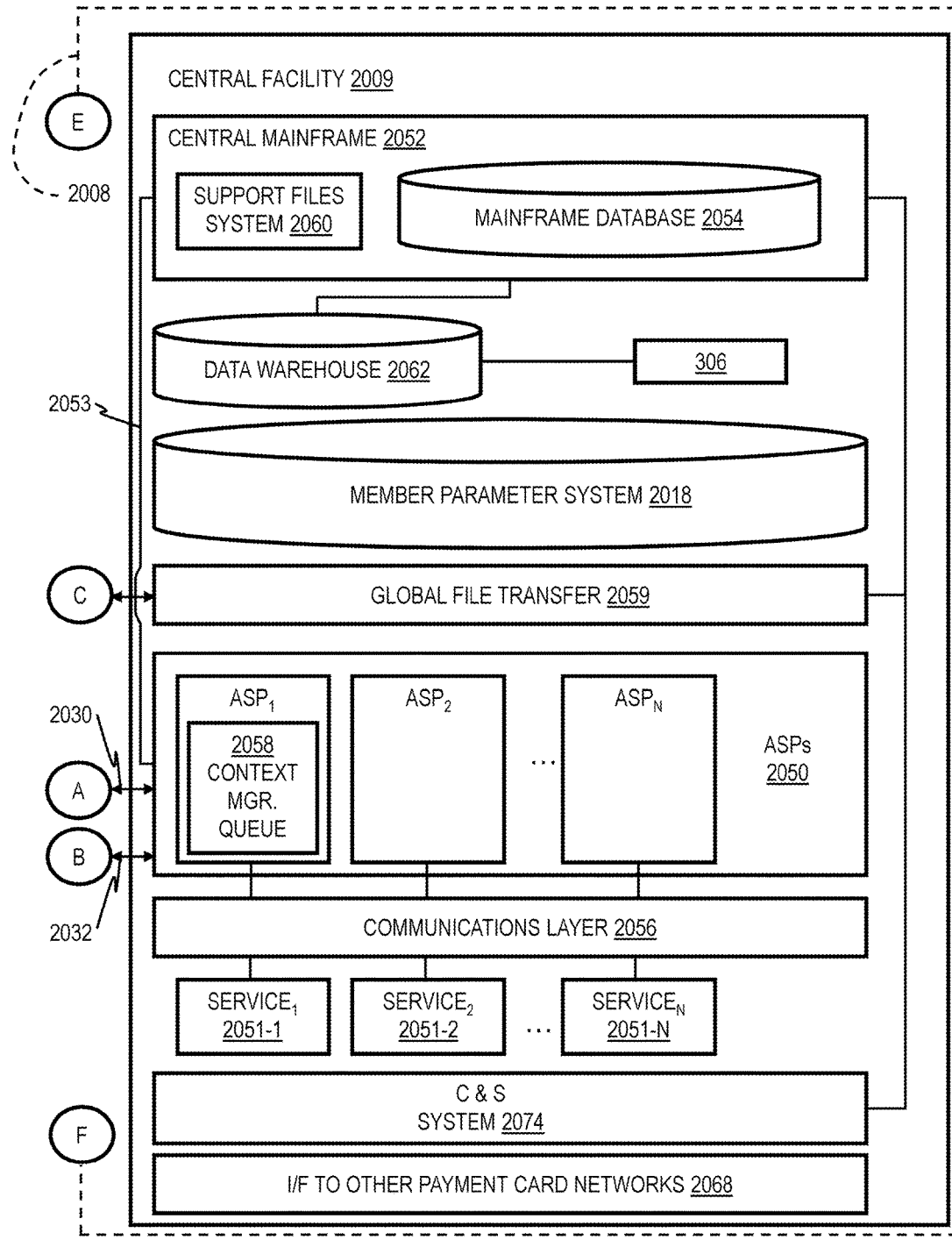

Still referring to FIG. 2, and with reference also now to FIGS. 11 and 12, by way of review and provision of additional detail, a consumer 2002 effectively presents his or her card 150 or other payment device (e.g., presents suitably configured "smart" phone or uses an e-wallet) to the terminal 126 of a merchant. A mag stripe card 150 and combined terminal 126 are shown by way of example, but are intended to generally represent any kind of payment device and any kind of terminal. The effective presentation can happen directly (user enters a brick and mortar location of a merchant 2004) or virtually (user logs on to a web site of a merchant 2004 via a browser of a personal computer or the like, or calls on the telephone, and provides card information, or sends a "snail" mail with payment card account information to a merchant). The merchant terminal 126 captures the card account information (by swiping or wireless communication if directly presented; by manual keying or reading data if remote) and forwards same to the acquirer 2006. Interaction between the merchant and cardholder is outside the purview of the payment card network per se. The payment card network becomes involved at the connection between the acquirer 2006 and network 2008; the dotted line between points E and F in FIGS. 11 and 12 encompasses the network 2008. Note generally that points A, B, C, E, and F in FIG. 11 connect to the corresponding points in FIG. 12; the entire network and associated environment are not amenable to illustration on a single sheet.

More specifically, the acquirer 2006, in the more specific example of FIGS. 11 and 12, has at its premises a payment network interface processor (PNIP 2012). The MasterCard Interface Processor or MIP is a non-limiting example of a PNIP. In a non-limiting example, the PNIP is implemented on a rack-mounted server. PNIPs are typically located at the edges of the payment card network. In at least some instances, the payment card network of FIG. 2 is a distributed network wherein each acquirer and issuer has at least one PNIP on their premises. Each acquirer 2006 will have a relationship with one or more merchants 2004 and will interface with the merchants' terminals 126 via terminal driver 2014 (an acquirer may also act as an acquirer for themselves as a merchant). Furthermore in this regard, the merchant locations will have terminals where the cards are swiped (or where contacted or contactless devices are presented). The acquirer will employ terminal driver 2014 to interface with those terminals. Terminal driver 2014 is a logical block representing software and/or hardware that allows the acquirer processing platform 2015 to communicate with the terminals of the merchants via TCP, dial up, or the like (TCP/IP interfaces 2016 are shown in the example in the figures). Each merchant will decide what acquirer to use to accept one or more brands of payment cards, and the acquirer will set the merchant up with the appropriate software and/or firmware for the merchant's point of sale devices.

The acquirer 2006 will present transactions from many different merchants 2004 to the payment card network operator 2008 via the PNIP interface 2012. The connection between the merchants 2004 and the acquirer 2006 is typically a TCP/IP interface 2016. The format that the transaction is in when the card is swiped at the merchant 2004 may differ from the format that the transaction is in when actually received by the payment card network operator. The acquirer may convert the transaction into the ISO 8583 format or into a format that is a specific implementation of the ISO 8583 format (e.g., the MASTERCARD CIS (customer interface specification) format. The authorization request message can be an ISO 8583 message type identifier (MTI) 0100 message, for example, sent over the communications interface 2016 between the merchant 2004 and the acquirer 2006.

Once the 0100 message is received at the PNIP 2012 of the acquirer 2006, a series of edits can be performed on the transaction with respect to format, content, and/or context. Furthermore, screening can be carried out to determine whether the message relates to something beyond an ordinary authorization request, referred to as an enhanced service. Enhanced services may be screened for on behalf of one or more issuers 2010 and/or the operator of network 2008 itself. A centralized member parameter system (MPS) 2018 can be provided to house parameters used to drive processing of credit authorization transactions. In one or more embodiments, extracts from the centralized member parameter system 2018 are distributed to all acquirer PNIPs 2012 and issuer PNIPs 2024 on the network 2008 on a daily basis to drive processing of credit card transactions.

It should be noted at this point that an "ICA" and a "BIN" are employed in BANKNET so that a member can perform card issuing and/or acquiring activities. An ICA or Interbank Card Association is a four to six digit identification assigned by MasterCard for use by a member to uniquely identify activity the member is responsible for. A BIN or Bank Identification Number is a unique series of numbers assigned by MasterCard to a principal member and used as the first six digits of a cardholder account number. Other payment card networks have similar types of numbers, as will be apparent to the skilled artisan.

In at least some embodiments, the same member parameter extract is sent to all PNIPs and transactions are routed using same. In at least some circumstances, account numbers or ranges of account numbers are used in deciding how to route. In some cases, transactions are routed to an issuer PNIP based on where the account range is "signed in." Issuers send an MTI 0800 sign in request message with either a group ID or account range. The Member ID is pulled from the PNIP port 2038 configuration and transactions from that account range are then routed to the port from which the sign-in request is received. A member ID can be present on ports on multiple PNIPs at an Issuer site—see discussion of FIG. 15 below.

In one or more embodiments, based on the account range, the parameters in MPS 2018 (or a local extract thereof) will determine how to process a given transaction; e.g., product code, country code, currency code, and the like, including what enhanced services (if any) the issuer has signed up for on a particular account range. That is to say, the messages are parsed and certain fields, including the account range, are examined; the account range is associated with a certain issuer and based on that, the message may be treated differently. Messages may be parsed, and converted into an internal data format so that access can be obtained to all the individual data elements. In one or more embodiments, the account number is used as a key to access the MPS 2018 (or a local extract thereof) and retrieve all the parameters that are appropriate for processing the given transaction. In a non-limiting example, a suitable message parser 2020 (and other programs on the PNIP 2012) can be written in an appropriate high-level language or the like.

In an exemplary embodiment, the central MPS 2018 creates extracts once a day that are distributed out to the endpoints on the network (e.g., PNIPs 2012), as seen at 2022. These extracts include the pertinent information needed for the PNIP to process the message and determine if it requires any special handling. In some instances, messages are next routed to a central site 2009 for performance of enhanced services. On the other hand, if no special services are required, the message may be routed directly to the issuer PNIP 2024 as seen at 2026.

Messages routed directly to the issuer PNIP: In this aspect, the transaction is routed directly to the issuer PNIP 2024 based on the MPS extract 2022, as seen at 2026. Every account range will have a unique destination endpoint identified in the parameters (account ranges may be grouped and all members of the account range group may have a common destination endpoint). The member interface refers to the connection between the acquirer processor 2006 and the Acquirer PNIP 2012. This term also applies to the interface between the Issuer PNIP 2024 and issuer processor 2010. The connections between and among acquirer PNIP 2012 and issuer PNIP 2024, acquirer PNIP 2012 and ASPs 2050, and ASPs 2050 and issuer PNIP 2024 are referred to as a network interface onto the payment card network itself. In one or more embodiments, this may be a TCP/IP connection (as seen at 2026) with customized routing capabilities including group addresses. Normally, TCP/IP addresses refer to a single endpoint. Group addresses may be directed to a group of addresses, and will target any of the computers (e.g., PNIPs) in the group using a variety of protocols. Some use a round robin approach; others may use a first in list approach where the message is always routed to one given computer first and then to a second computer only if the first is not available. Group addressing may be useful, for example, where an acquirer or issuer has multiple PNIPS at the same location for redundancy/fault tolerance. It is also possible to combine the approach and institute a round robin, wherein the addresses within the round robin are first in list group address, or conversely, it is possible to institute a first-in-list, wherein the addresses within the first-in-list are round robin group addresses. These capabilities are useful in case of outages, maintenance, and the like.

Figure 13:
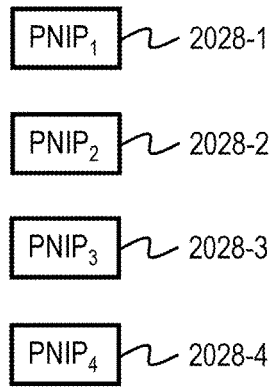
FIG. 13 shows a group of payment network interface processors, such as may be used with the network of FIGS. 11 and 12.
Figure 14:
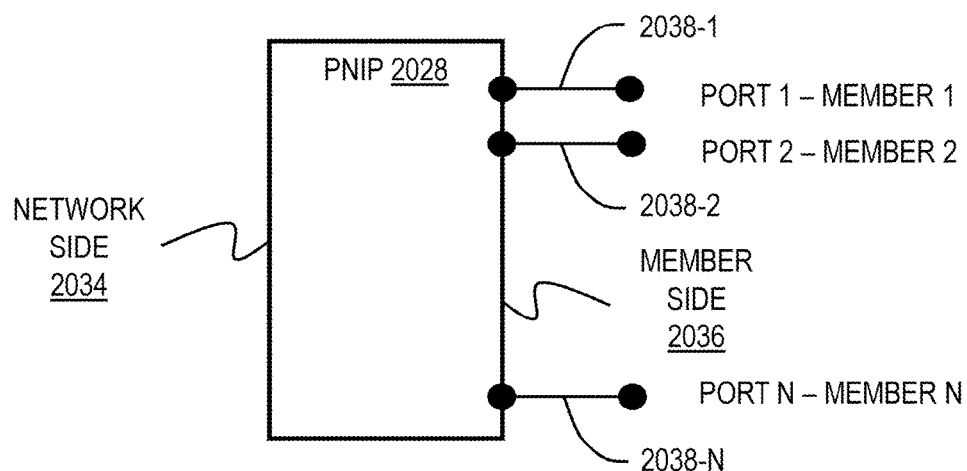
FIG. 14 shows a port arrangement on a payment network interface processor, such as may be used with the network of FIGS. 11 and 12.

FIG. 13 shows a non-limiting example with four PNIPs 2028-1 through 2028-4. In a round robin approach, a first message is routed first to PNIP 2028-1, a second message to PNIP 2028-2, a third message to PNIP 2028-3, a fourth message to PNIP 2028-4, a fifth message to PNIP 2028-1, and so on. In a first in list approach, all messages are routed to PNIP 2028-1; if it is not available for a given message, the message is routed to PNIP 2028-2; if PNIP 2028-2 is not available, the message is routed to PNIP 2028-3; if PNIP 2028-3 is not available, the message is routed to 2028-4. Each PNIP 2028-1 through 2028-4 in FIG. 13 could be a single machine or a group of machines addressed by first in list or round robin as discussed just above. In one or more embodiments, the physical network 2026 between PNIPs 2012, 2024 and the physical network 2030, 2032 between PNIPs 2012, 2024 and the central site 2009 is a private Multiprotocol Label Switching (MPLS) TCP/IP network and is not the Internet. Once the issuer's network group address has been determined by the PNIP 2012 (or ASP 2050), the message is routed to the issuer PNIP 2024. Once the 0100 auth message arrives at the issuer PNIP 2024, additional edits are performed to double check and make sure that the message has been routed to the correct location. Furthermore, the member ID is examined, because some issuers may share a single PNIP and it is necessary to determine which of the issuers (members) sharing that PNIP the transaction in question is to be routed to. Each of the issuers sharing the PNIP will have its own port on the member side of the PNIP; the transaction is routed to the appropriate port based on the member parameters. See FIG. 13 where a generalized PNIP 2028 has a network side 2034 and a member side 2036. Member side 2036 has N ports 2038-1 through 2038-N to members 1 to N. N is used herein as a generalized arbitrary integer and the value of N in FIG. 14 is not necessarily the same as that of N in connection with elements 2002 in FIG. 2, for example.

Figure 15:
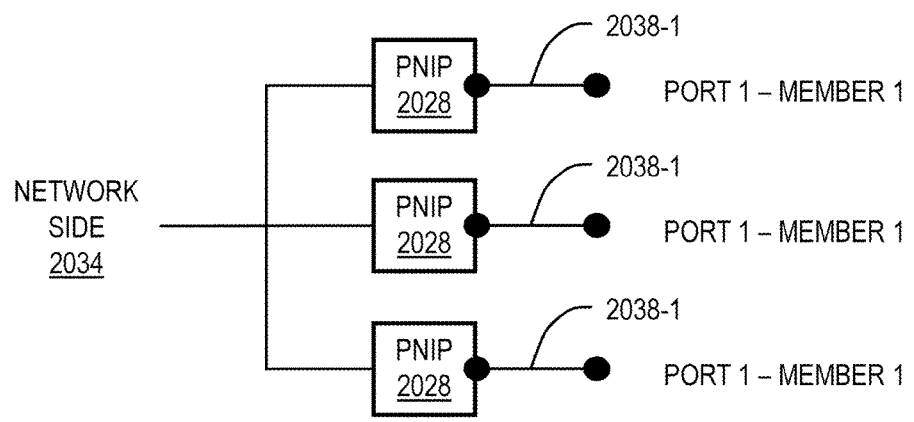
FIG. 15 shows a case wherein an issuer has multiple payment network interface processors.

As seen in FIG. 15, in some instances, an issuer has multiple PNIP devices 2028 at a single site, with a network-side connection 2034, and with multiple PNIPs 2028 all connected to the same host system (each has port 1 2038-1 associated with the same member (issuer)).

At this point, the 0100 message has been delivered to the issuer 2010. The issuer 2010 then carries out issuer processing and decisioning (e.g., with issuer processing platform 2040) based on transaction velocities, open to buy, fraud detection protocols, etc., and provides an appropriate authorization request response, ISO 8583 MTI 0110. There are a number of different possible response codes defined within ISO 8583 and its particular implementations. Each transaction is made up of multiple data elements; the response from the issuer is included in data element 39. Once the 0110 message is received on the issuer PNIP 2024 from platform 2040 it is parsed and edited for format, content, and context, including validation of DE39 to make sure that it is a valid value.

It is worth noting that in one or more instances, at every point where a transaction touches a computer of the payment card network, whether it be an acquirer PNIP 2012, issuer PNIP 2024, or a special services computer or computers 2050 at the central location 2009 (discussed below), transaction context is preserved. That is to say, before the message is sent on to the next node in the network, a copy is saved in a context manager queue 2042, 2046, 2058, so that when the transaction response MTI 0110 comes back through, the request MTI 0100 can be matched with the response, in order to know how to route the response back to the previous route point. One of the items saved in the context manager queue is the message originator's address, so that it can be used for route-back information. Once the issuer PNIP validation is complete, including format, content, and context edits, the transaction is extracted from the context manager queue 2046 and the route-back address is retrieved, and the 0110 message is then sent back where it came from; in this case, the acquirer PNIP 2012 (or ASP 2050). The acquirer PNIP 2012 then receives and parses the message and pulls its original request out of its context manager queue 2042. Note that multiple acquirers may share an acquirer PNIP and it is therefore necessary to know which port on the acquirer PNIP to route the response back to (see discussion of FIG. 13). Checking the message against the original request in the context manager queue allows the message to be routed back to the correct port.

Each PNIP 2012, 2024 typically has many different programs. These can include, for example, a parser/editor 2020, 2043; a parameter file manager; a transaction context manager; a member communications program; a network communications program; and the like. Please note that to reduce clutter, FIGS. 11 and 12 show "MPS extract" 2022, 2044; this will typically include the extract itself and the associated parameter file manager which manages obtaining the extracts from MPS 2018. Similarly, to reduce clutter, FIGS. 11 and 12 show "context manager queue" 2042, 2046; this will typically include the queue itself and the associated manager which manages the contents of the queue. In one or more embodiments, there is also a communication program used to communicate between the other programs (inter-process communications) on the PNIP; this is omitted from FIGS. 11 and 12 to avoid clutter.

Messages in case of Enhanced Services: In one or more instances, a special architecture is used to facilitate delivery of enhanced services (the ASP 2050 in FIGS. 11 and 12 is a non-limiting example). Examples of enhanced services include the MasterCard "inControl" product providing spending controls and/or virtual card numbers. Other examples are loyalty rewards, recurring payment cancellations, and the like. One or more instances do not deploy this complex logic out to the network edge. Furthermore in this regard, the issuer and acquirer PNIPs 2012, 2024 are being referred to as being on the edge because they reside on the customer's premises 2006, 2010. There may be over 2000 PNIPs on a typical network. The special architecture used in one or more instances is a central site type architecture associated with location 2009. At the central site 2009, certain computers are referred to as authorization services processors or ASPs 2050.

On the acquirer PNIP 2012, when checking the member parameter file for an account range, determine whether the transaction requires enhanced services. If yes, the transactions is routed to the central site ASPs 2050, which have interfaces to all of the service provider systems—the ASPs do not necessarily provide the services themselves (although they can in some embodiments), but may mediate between the network (e.g., BANKNET) and the actual service providers 2051-1 through 2051-N. An ASP will typically have connections 2053 to a mainframe 2052 via DB2 connect or other suitable connection. If a transaction is to be enriched with additional data, a database call will be made to the mainframe 2052 to retrieve the information from mainframe database 2054 so that it can be inserted into the transaction before the transaction is forwarded to the issuers. Interfaces can also be provided to a risk management system, a decisioning management system, IN CONTROL, rewards, and the like. Service providers 2051-1 through 2051-N generally represent any enhanced services, non-limiting examples of which have been given herein.

A communications layer 2056 is used to communicate with the service providers in one or more embodiments, a non-limiting example of a suitable implementation is the IBM MQ series. The 0100 message may be sent to the service providers, optionally encapsulated inside a special "enhanced services" (ES) header that wraps the message with any additional information required to fulfill the service. The service provider sends a response. The ASP takes the response and enriches the 0100 transaction with the service response, and then sends the entire package on to the issuer PNIP 2024. Some enhanced services are processed on the request messages (0100) and others are processed on the response messages (0110). Once the response message is processed on the ASP, the original message will be pulled from the context manager queue 2058 on the ASP to determine the appropriate acquirer PNIP 2012 to route the message back to. From there, the acquirer PNIP will behave just as in the "Messages routed directly to the issuer PNIP" case discussed above. Some embodiments of the special architecture use an Enterprise Service Bus to mediate and facilitate some of the services 2051. For example, the In CONTROL service can be accessed via an instance of an Enterprise Service Bus.

Entry of Data into the Data Warehouse: In one or more instances, every transaction that flows through the issuer PNIP 2012, acquirer PNIP 2024, and/or ASPs 2050 is logged at every point by writing log records. Multiple times a day (e.g., six), a global file transfer system 2059 pulls the logs off each node and collects them into a support files system 2060 on the mainframe 2052. The log files are parsed and collected into a general daily file. The general daily file is scrubbed and modified to create a consolidated file on the mainframe which is then pulled into the data warehouse 2062, where additional data manipulation and scrubbing are performed before the transactions are stored. The data warehouse 2062 is located at an intermediate node (location 2009) connected to the PNIPs of the acquirers and issuers 2012, 2024. By way of clarification, in one or more embodiments, the node 2009 is directly connected to the PNIPs 2012, 2024 but the data warehouse is not directly connected to the 2012 and 2024 devices; rather, data flows through GFT and SF systems 2059, 2060 and ends up in the data warehouse. Data warehouse 2062 should be distinguished from a data warehouse 154 that might be maintained by an issuer.

Clearing and Settlement: One or more instances employ a clearing and settlement system 2074. In clearing, via global file transfer 2059, acquirers submit clearing files in an appropriate message format (in a non-limiting example, Integrated Product Messages (IPM) format). The files contain, from the acquirers' perspective, what they believe they should be paid for. In one or more instances, the authorization does not actually move any money; the authorization only validates that the cardholder is a valid cardholder recognized by the bank, which will honor payment to the merchant for the goods or services. For example, in a typical restaurant visit, the card is swiped for the receipt amount but then a tip is added. The clearing message will have the actual food amount plus the tip. In one or more instances, the clearing does not actually move the money; it merely resolves the actual amounts. The settlement system actually initiates movement of the money. Furthermore in this regard, the settlement system actually tells the banks how much money to move but does not actually move the money. Within clearing, processes include dispute resolution, chargeback, and the like. During clearing, files are sent from the acquirers to the payment card network; the payment card network, using clearing and settlement system 2074, then takes the files and splits them and sorts them by issuer. Response files are then received from each issuer, and these response files are again split and re-sorted back to the correct acquirers. Eventually, data flows into the settlement system and money is moved. Thus, at a high level, the auth request and auth request response are in real time, and the clearing and settlement are in a batch mode.

By way of review and provision of additional detail, in at least some instances, in a batch mode, clearing is initiated via an ISO 8583 MTI 1240 message having a DE24 function code value of 200 for a first presentment. Once this message is obtained from the acquirer, the payment card network, using clearing and settlement system 2074, will undertake syntax edits, format edits, content edits, and context edits (typically applied to every transaction). If those edits are passed, the interchange and fees associated with the transaction will be calculated. Based on the calculations, the message may also be enriched with additional information before being passed on to the issuer. The settlement amount is then determined. Within the clearing cycle, the amounts of money due to each given member (e.g., issuer or acquirer) are accumulated, and these are summed up into a settlement file which is forwarded in due course.

Cryptographic Aspects: Consider the concepts of data at rest and data in motion. An example of data at rest is the log files that actually reside on the PNIPS themselves—configuration information containing card numbers or personally identifiable information (PII). In one or more embodiments, all sensitive data at rest is encrypted before being written to disk. Data in motion refers to data actually moving over a transmission medium (e.g., wires, coaxial cable, fiber optic cable, RF link). All PCI-sensitive data (PCI Security Standards Council, LLC, Wakefield, Mass. US) is encrypted, whether written to disk or being sent over a network. In at least some instances, internal links within the premises of the acquirers and issuers are not encrypted since it is assumed that the customer premises are a physically secure facility relying on physical security of the hardware. On the other hand, in at least some instances, external links (e.g., links 2026, 2030 and 2032) are all encrypted for both authorization traffic and bulk file transfers.

One or more embodiments will have interface(s) 2068 to other brands of payment card processing network. For example, a MASTERCARD branded payment card processing network may have interfaces to networks such as AMERICAN EXPRESS, VISA, JCB, DISCOVER, and the like. Suitable translation layers can be provided to intermediate between MASTERCARD (or other) format and formats used by other networks, as appropriate. In one or more embodiments, interfaces 2068 to other payment networks are provided via a machine, located at 2009, but generally analogous to an Issuer PNIP 2024 with added mediation layers loaded as required by other payment network formats. Some merchants may only have a single interface to, e.g., the MASTERCARD network—all transactions from that merchant may be routed to MASTERCARD, regardless of what card was used—MASTERCARD will process those transactions and route them out to the appropriate networks. Electronic Bill Presentment and/or Payment Systems Referring now to FIGS. 3 and 4, electronic bill payment systems are conceptually different than payment card networks, and will often use electronic funds transfer from a demand deposit account. In some instances, a single entity, such as MasterCard International Incorporated (a non-limiting example) will operate both a payment card network and an electronic bill payment system (optionally, with presentment functionality).

With regard to electronic bill presentment and payment systems, inventive techniques can be employed in a number of different environments. In one or more embodiments, inventive techniques can be employed in connection with the MASTERCARD RPPS® electronic payment system of MasterCard International Incorporated of Purchase, N.Y., USA. This example is non-limiting; for example, other types of electronic bill presentment and/or payment systems could be employed in other instances. Non-limiting examples are is described in:

US Patent Publication 2011-0251952 A1 of Mary L. Kelly et al (expressly incorporated herein by reference in its entirety for all purposes).

US Patent Publication 2012-0197788 A1 of Hemal Sanghvi et al (expressly incorporated herein by reference in its entirety for all purposes).

US Patent Publication 2013-0290177 A1 of Amy Christine Milam and Stephen Joseph Klaus (expressly incorporated herein by reference in its entirety for all purposes).

US Patent Publication 2013-0311362 A1 of Amy C. Milam et al. (expressly incorporated herein by reference in its entirety for all purposes).

For the avoidance of doubt, references to MasterCard, unless expressly stated to be limited to MasterCard, are intended to be exemplary of an operator of an electronic bill payment system (optionally, with presentment functionality) and/or an operator of a payment card network, as will be appreciated from the context, whether or not qualified by words such as "or other operator."

Furthermore, another non-limiting example of electronic bill presentment and/or payment systems with which one or more embodiments of the invention can be employed is the CHECKFREE platform available from Fiserv, Inc. of Brookfield, Wis., USA. Other non-limiting examples are discussed below and/or will also be apparent to the skilled artisan, given the teachings herein.

Figure 3:
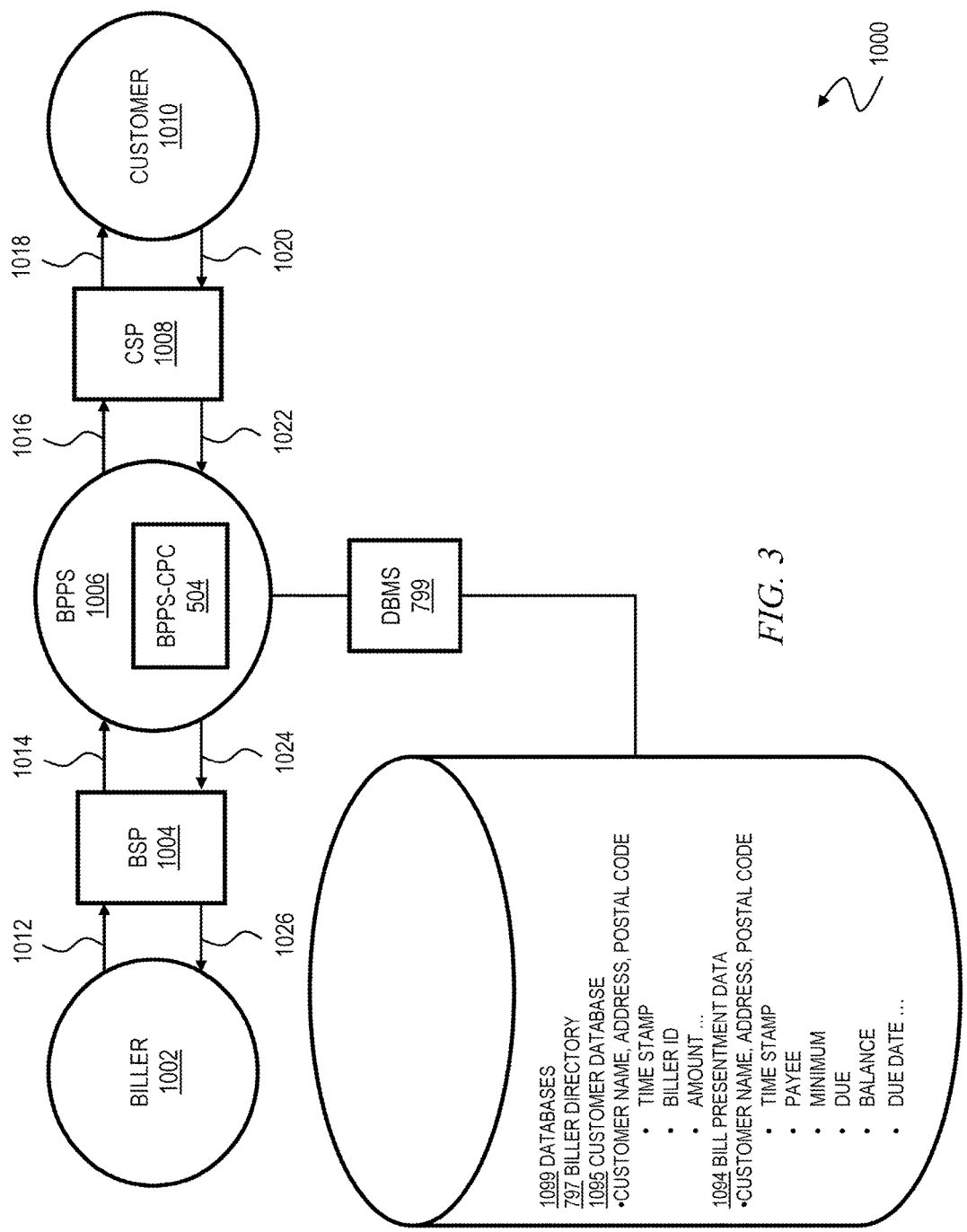
FIG. 3 shows exemplary operation of a bill pay system, in accordance with an aspect of the invention.

FIG. 3 shows operation of an electronic bill payment system, such as the MASTERCARD RPPS® electronic payment system, which is but one non-limiting example of such a system, modified in accordance with aspects of the invention. Given the teachings herein, the skilled artisan will be able to implement one or more embodiments of the invention using a variety of techniques; by way of example and not limitation, the modification or supplementing of an existing MASTERCARD RPPS® system or other electronic payment system as shown in FIG. 3. As shown in FIG. 3, in an approach 1000, during a presentment phase, a biller 1002 electronically sends billing information 1012 to its biller service provider (BSP) 1004; that is, an institution that acts as an intermediary between the biller and the consumer for the exchange of electronic bill payment information. BSP 1004 in turn sends the information to the electronic bill payment system 1006, as seen at 1014. As seen at 1016, the system 1006 in turn delivers the billing information to the customer service provider (CSP) 1008, that is, an agent of the customer that provides an interface directly to customers, businesses, or others for bill payment and presentment. The CSP enrolls customers, enables payment and presentment, and provides customer care. CSP 1008 presents the bill to the consumer (customer) 1010 at 1018.

In a payment phase, consumer 1010 sends bill payment instructions to CSP 1008, as seen at 1020. CSP 1008 in turn sends the bill payment information to the system 1006, as at 1022. The system sends funds and data electronically to BSP 1004, as at 1024. The BSP 1004 posts payment information to the biller 1002, as at 1026.

Note that in some instances, billers 1002 can connect directly to BPPS 1006 without the use of BSP 1004. In such cases, billers 1002 exchange presentment and payment data directly with BPPS 1006.

Database(s) 1099 include biller directory 797, customer database 1095, and/or bill presentment database 1094. All may be accessed, for example, by database management system 799. MasterCard's RPPS Biller Directory is a non-limiting example of biller directory 797. Each biller in the biller directory is identified by a unique Biller ID. Records in the biller directory 797 will also typically include the name and address information for the biller corresponding to the Biller ID, as well as the biller's demand deposit account to which payments should be routed (conventional) or payment card account in which a business can receive payments from customers via a special payment transaction over a payment card network (in one or more embodiments). Of course, other embodiments could use a different database configuration than that shown and described herein. Customer database 1095 includes, in one or more embodiments, the customer's name, address, and postal code, and for each payment, time stamp for the payment, Biller ID, and amount. In a non-limiting example, bill presentment can be carried out via a web site operated by an underlying bank. The bank will typically have a Party ID and Party Collection ID. The Party ID will identify unique individuals. The Party Collection ID will be for a household including one or more individuals. Thus, customer database 1095 can include household IDs with associated data and individual IDs with associated data. It should be noted that in some cases, some data referred to as residing in customer database 1095 (e.g., customer's home address) may be maintained by customer service provider(s) 1008 rather than electronic BPPS 1006; database 1095 may thus, in some cases, be implemented as a composite of several databases maintained by customer service provider(s) 1008 and electronic BPPS 1006. Bill presentment database 1094 may include "raw" presentment data. It is described for completeness, although it will be appreciated that one or more embodiments utilize ACH or other EFT payment data as opposed to presentment data. A non-limiting example of bill presentment data such as would typically be available in database 1094, representing bill presentment as described with regard to 1012, 1014, 1016, 1018, includes Time Stamp, Payee, Minimum due, Total Balance, and Due Date. Of course, there would be many users of the electronic BPPS, and there would typically be many bill presentment records for each user.

Note that "BPPS" is used herein as shorthand for an electronic "bill presentment and payment system"; the MASTERCARD RPPS system is a non-limiting example of such a system. Furthermore, new functionality from a new bill presentment and payment system card payment component (BPPS-CPC) 504, according to aspects of the invention, is discussed below.

Figure 4:
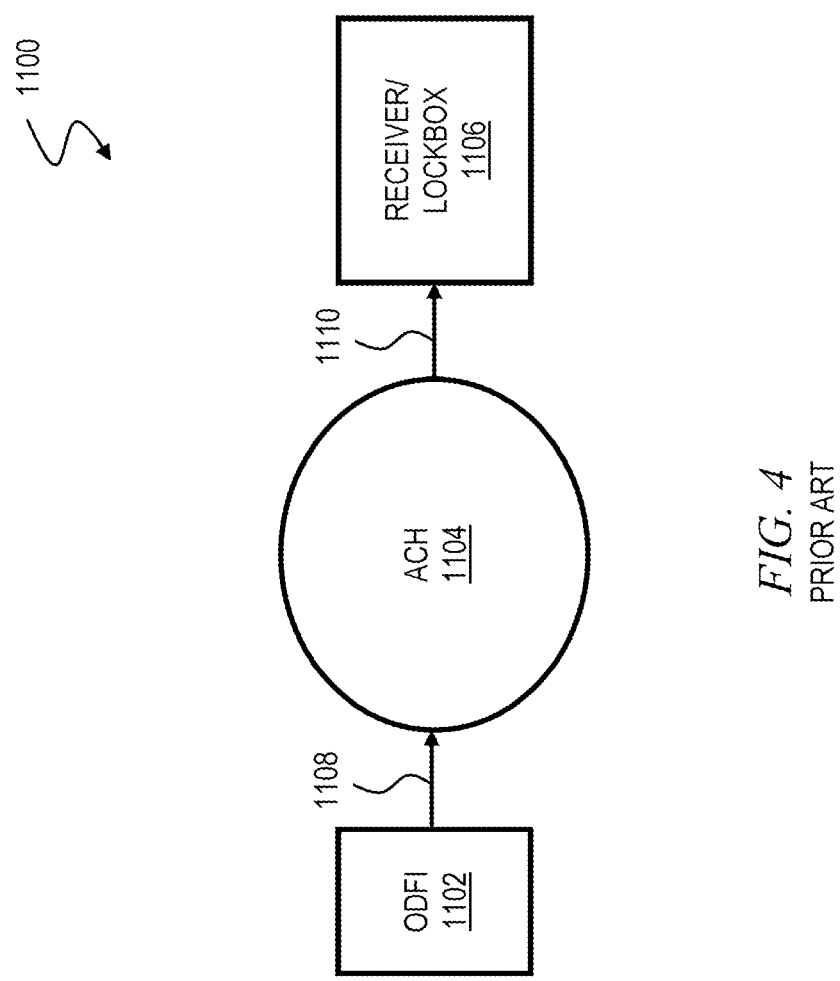
FIG. 4 shows exemplary operation of current automated clearinghouse payments.

FIG. 4 shows a current process 1100 for making electronic funds transfers (EFT) for bill payment or the like. An originating depository financial institution (ODFI) 1102, also known as an originator, sends instructions (e.g., payment data and remittance data) using a network such as the automated clearing house (ACH) 1104, Swift, EPN, CHIPS, Fedwire, and the like, as seen at 1108. As shown at 1110, the ACH or similar network 1104 relays the instructions to the receiving depository financial institution (RDFI) (e.g., receiver or a lockbox), designated 1106. In some embodiments, an ACH file format can be used; non-limiting examples of ACH file formats include the NACHA ACH CIE, NACHA ACH PPD, or NACHA ACH CCD (e.g. for corporate-to-corporate cases) file formats. Other formats can also be used; for example, extensible markup language (XML). It should be noted that a variety of networks can be used, both public (for example, ACH) and proprietary (for example, the aforementioned MASTERCARD RPPS system).

Figure 5:
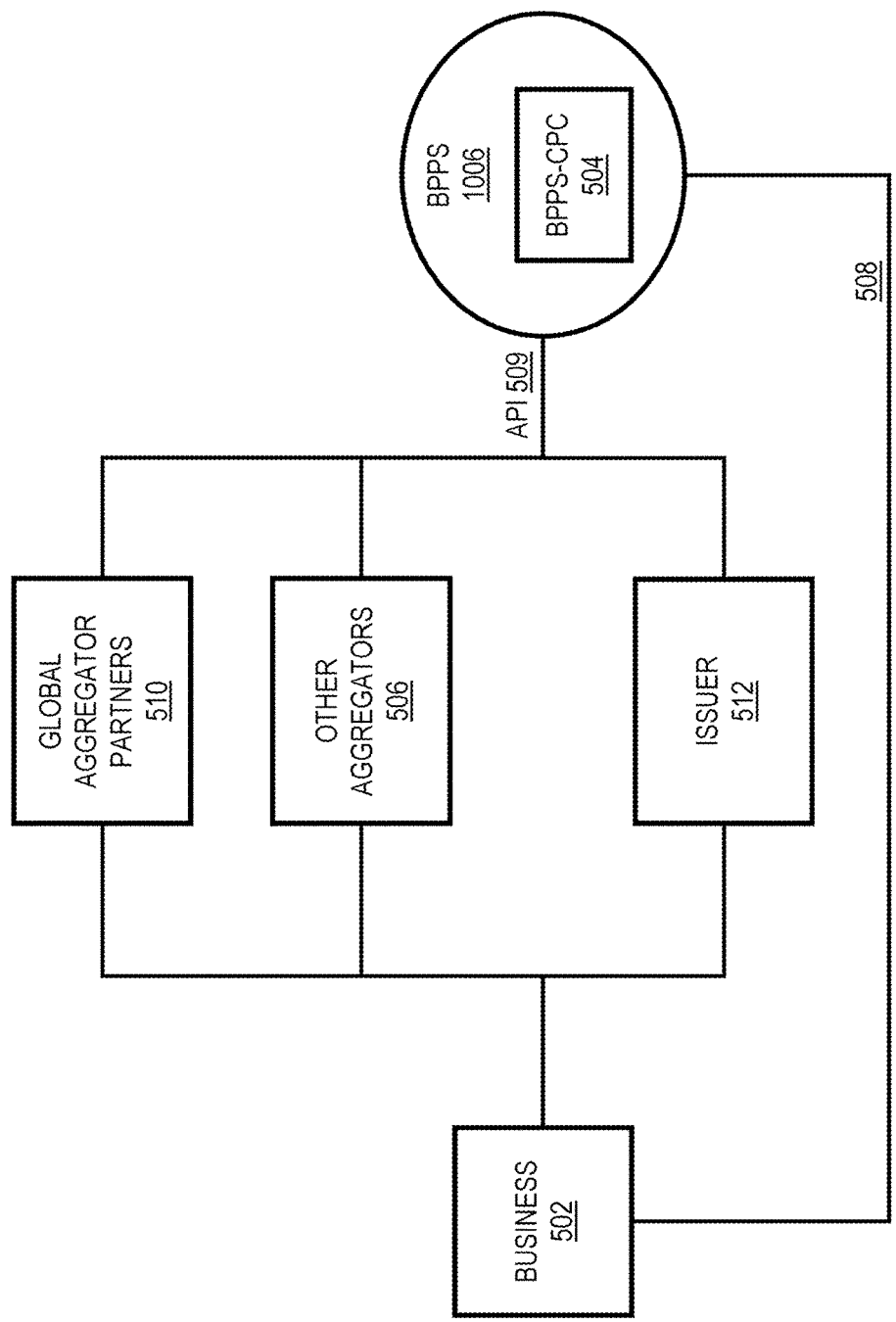
FIG. 5 depicts a high-level flow of business registration, according to an aspect of the invention.

As used herein, an "electronic bill presentment system using customer service providers" refers to a system wherein electronic bills are distributed from billers, through an aggregator switch, out to financial institutions or other customer service providers such that those financial institutions or other customer service providers can display the electronic bills, through the financial institutions' or other customer service providers' own on-line banking interface, to bill-paying customers of the financial institutions or other customer service providers. FIG. 5 of the above-referenced US Patent Publication 2011-0251952 A1 of Mary L. Kelly et al. shows an exemplary block diagram of an electronic bill presentment system, including a bill payment platform and a bill presentment platform; the bill payment platform may utilize techniques disclosed in the above-referenced US Patent Publication 2012-0197788 A1 of Hemal Sanghvi et al.

Some electronic bill payment systems use the NACHA ACH Standard Entry Class (SEC) formats, such as CIE (Customer Initiated Entries), CTX (Corporate trade exchange); CCD (Cash Concentration or Disbursement); or PPD (Prearranged payment and deposits). Some electronic bill payment systems use a modified form of the NACHA CIE (MOD-CIE) wherein a payment system operator requires specific values for certain fields. Some electronic bill payment systems (e.g., MASTERCARD RPPS) provide translation capability and can receive input in many different formats, translate it for internal use, and translate it again for output in many different formats, which may be the same as or different from the input formats. Some electronic bill payment systems provide customer service providers with the capability to specify when the electronic bill payment system will look to them for payment instructions. Some electronic bill payment systems provide biller service providers with the capability to specify when the electronic bill payment system will initiate payments. FIG. 5 of the above-referenced US Patent Publication 2012-0197788 A1 of Hemal Sanghvi et al. shows exemplary system interfaces of an electronic bill payment system.

As noted above, electronic bill presentment and payment systems are conceptually different than payment card networks, and will often use electronic funds transfer from a demand deposit account. Nevertheless, some electronic bill presentment and/or payment systems receive and send data over a network such as is shown in FIG. 2, using capability such as MasterCard Global File Transfer (GFT). Furthermore, US Patent Publication 2010-0100480 of Theresa Altman et al., hereby expressly incorporated by reference herein in its entirety for all purposes, describes a system wherein payment of a bill using a payment card account is facilitated by formatting and dispatching a message from a bill payment provider to an electronic bill payment system. The message is flagged with a flag indicating that the message includes a non-financial, card payment, message. The message includes an identification of the biller, a card number of the payment card account, and an expiration date of the payment card account. The message is an electronic funds transfer message augmented with the flag, the card number, and the expiration date.

Some electronic bill payment systems use technology such as described in the above-referenced US Patent Publication 2013-0290177 A1 of Milam and Klaus to reduce the number of non-electronic payments. Some electronic bill payment systems use technology such as described in the above-referenced US Patent Publication 2013-0311362 A1 of Amy C. Milam et al. to facilitate approximately matching entered payee information to stored biller information.

Settlement to a Merchant's Card Account Using an On-Line Bill Payment Platform

In one or more embodiments, an electronic bill payment system, optionally with presentment functionality, is expanded to settle real-time with small businesses using a special transaction (e.g., ISO-8583 message type 0100 with transaction type twenty eight, or an ISO-8583 message type 0200 with transaction type twenty eight, as discussed further below), such as the MasterCard MONEYSEND Payment Transaction, in place of existing ACH and Wire transfer payments. Additionally, one or more embodiments provide the capability for businesses to register for the service directly with an entity such as MasterCard, or through a participating partner.

Furthermore in this regard, one or more embodiments expedite the receipt of funds for business from online bill payment, by adding a new option for businesses to receive funds to their payment card accounts (e.g., MASTERCARD card or VISA card accounts). In the case of providing a debit card to receive a payment, the funds are transferred directly into the business' bank account via a special payment transaction over a payment card network (as opposed to a prior art ACH or wire transfer). Furthermore in this regard, today, businesses can receive online bill payments via an electronic bill payment system by ACH or wire transfer. Note that one or more embodiments are believed to be particularly useful for small businesses which have hitherto been unable to receive electronic payments; however, this is not a limitation.

In an exemplary embodiment, in a first step, a small business registers with an electronic bill payment system, optionally with presentment functionality (throughout this discussion, unless expressly indicated that presentment functionality is required, presentment functionality in a bill payment system is to be understood as optional). For example, the small business registers with a biller directory 797, discussed further below, such as MasterCard's RPPS Biller Directory and provides, for example, its MASTERCARD card or VISA card account information. Upon completion of registration, the small business is given a Biller ID (e.g., by MasterCard, a partner of MasterCard, or by MasterCard or a partner accepting a small business-generated Biller ID such as an e-mail address or the like). Registration can happen directly through a service provided by the operator of the electronic bill payment system, or through a partner such as an accounting package, issuer, acquirer or payment provider. In the latter case, these third party services use, for example, one or more APIs (collectively API 509, discussed further below) provided by the operator of the electronic bill payment system, to register a small business and receive a Biller ID, which it provides to the small business.

Furthermore with regard to Biller ID, in some instances, the (small) businesses are afforded an opportunity to set up email addresses as an ID for payments. The (small) business provides an email address such as "payments at abclandscaping dot com" (at sign omitted and "." rendered as "dot" to avoid browser-executable code in text of patent application). When making an online bill payment, the consumer types in "payments at abclandscaping.com" (in place of a biller ID generated by the BPPS operator or third party partner such as 507). This e-mail address based ID is used as a unique identifier to look up the card account to initiate a special payment transaction.

In a second step, the small business names and IDs are provided to various payment providers (e.g., MasterCard RPPS; various banking, financial services, and/or payments industry technology providers; and the like) and banks through an existing file transfer process, or via APIs providing real-time access.

Existing API functionality, with which the skilled artisan is familiar, is to be distinguished from novel API functionality 509 in accordance with one or more embodiments of the invention.

In a third step, the small business includes the Biller ID on the invoices it provides to its customers.

In a fourth step, the customer authenticates himself or herself to his or her online bill payment service to pay the invoice. The customer searches for the small business by, for example, name, name and address, or Biller ID. The customer confirms when the correct biller has been identified. For example, the customer searches for "Chesterfield Landscaping" and views the address and confirms the biller; or the customer searches for Biller ID 123456 as indicated on the invoice, and "Chesterfield Landscaping" and its address are displayed—the customer confirms the biller. Once the biller is identified, the customer optionally enters an Account # and Invoice # which are vetted against pre-established criteria set by the small business, and then the customer enters the amount and confirms payment. In another option, outstanding invoices are displayed to the customer based on the account number provided.

In a fifth step, payment is routed directly to an electronic bill payment system, or to a third party intermediary such as a payment provider 507, who in turn routes the payment to an electronic bill payment system. The electronic bill payment system looks up the Biller ID and determines that the small business account to which payment is to be received is a card account. The electronic bill payment system originates a payment transaction to a payment card network to deposit the funds (in at least some embodiments, in real time). The payment card network may have the same brand and be operated by the same entity as the electronic bill payment system (e.g., MASTERCARD RPPS ELECTRONIC BILL PAYMENT SYSTEM AND MASTERCARD BANKNET PAYMENT CARD NETWORK), or the two may be branded and operated separately. A payment notification may be provided directly to the small business, or to the third party who registered the small business, depending on services configured for the small business.

Thus, currently, online bill payments are typically settled with businesses via ACH or Wire Transfer, whereas one or more embodiments add the capability to settle an online bill payment with the business using a special transaction (e.g., ISO-8583 message type 0100 with transaction type twenty eight, or an ISO-8583 message type 0200 with transaction type twenty eight, as discussed further below), such as the MasterCard MONEYSEND Payment Transaction or through similar payment transactions on partner networks.

Furthermore in this regard, one or more embodiments seek to "electronify" bill payments for small businesses. Currently, if someone's landscaper is a small business, he or she might go to an online bill payment site and have to type in the landscaper's name and address. However, the bank would not have the information available to route the payment electronically, so the bank would have to prepare and mail a paper check. One or more embodiments allow an entity such as MasterCard to aggregate a large number of small businesses and/or to work with partners to allow the partners to aggregate on the entity's behalf. For example, a provider of popular bookkeeping software may already have a good relationship with many small businesses), and would likely be a suitable partner. One or more embodiments, during a registration process, obtain from a small business its name and address information, as well as its preferred form of payment. One or more embodiments facilitate payment to the small business by crediting the small business' payment card account (e.g., MasterCard or VISA debit account) and can settle in real time using a payment card network such as MasterCard's BANKNET network or Visa's VISANET network, an interbank (e.g., debit) network, and the like. Current techniques are typically (i) not set up to permit payments to small businesses and (ii) limited to payment via ACH techniques.

Thus, one or more embodiments carry out payments to small businesses by transferring funds to demand deposit accounts of the small businesses via a card transaction over a payment card network such as the above-discussed special transaction, rather than ACH transfer. A debit card is a payment card that is linked to a demand deposit account. The special transaction as discussed above is a payment card transaction that allows funds to be pushed to a cardholder's payment card account, knowing the small business' debit card number ("cardholder" may or may not have a physical card associated with the account, but has a payment card account with a payment card account number). The special transaction includes the debit card number and allows real-time posting of funds to the merchant's debit card account.

Several different non-limiting exemplary scenarios regarding special transactions such as the MasterCard payment transaction or MoneySend will now be presented. In one scenario, a dual message model is employed. An "auth request" is sent (ISO-8583 message 0100 with Transaction Type (DE3sfl)="28" (Payment Transaction)) from the consumer's bank to the merchant's bank, over a payment card network (network 2008 is a non-limiting example). This guarantees the money transfer (reserves funds for the merchant). Subsequently (for example, in one day) a "First Presentment" message 1240 is sent in a bulk file which completes the transfer. In another scenario, a single message model is utilized. A Financial Transaction request is sent (ISO-8583 message 0200 with Transaction Type (DE3sfl)="28" (Payment Transaction)) from the consumer's bank to the merchant's bank, over a payment card network (network 2008 is a non-limiting example).

It is worth noting at this point that ISO 8583 message type 0100 is used in a conventional transaction as an authorization request from the acquirer 2006 to the issuer 2010 of the consumer's card, to which the issuer 2010 responds with an authorization request response 0110. The message type 0100 is also utilized conventionally for chargebacks and the like. The message type 0100 is utilized in a different way here based on a different code/transaction type than in the conventional applications (Transaction Type (DE3sfl)="28" (Payment Transaction)).

Thus, while the special transaction such as the MasterCard MoneySend payment transaction with transaction type "28" is itself known, one or more embodiments advantageously modify electronic bill payment network(s) to operate with this kind of special transaction in addition to the conventional ACH functionality. Furthermore, one or more embodiments advantageously provide a mechanism by which a large number of small businesses can be registered to take advantage of the new functionality.

One or more embodiments include a registration phase and a payment (operational) phase. Thus, in a sense, there are two pertinent aspects to one or more embodiments: (i) integrating the payment message into the electronic bill payment network (real-time component); and (ii) registration—currently, this happens in batch files—issuers or aggregators deliver files on a daily basis—one or more embodiments have real-time creation of a biller in the billing system via new application program interfaces (APIs).

FIG. 5 depicts a high-level flow of (e.g., small) business registration, according to an aspect of the invention. One or more businesses 502 desire to register a MasterCard or VISA debit card account (or even a credit or other card account and/or payment card account of a different brand) with a bill presentment and payment system card payment component (BPPS-CPC) 504, part of BPPS 1006, configured in accordance with one or more aspects of the invention. Again, not all embodiments need necessarily have presentment functionality. The one or more businesses 502 register with BPPS-CPC 504, for example:

Directly with BPPS 1006 with BPPS-CPC 504, as seen at 508

Via one or more global aggregator partners 510 (for example, providers of commonly used software such as accounting and/or bookkeeping software, customer relationship management (CRM) software; or other types of market aggregators or the like)

Via other types of aggregators 506; e.g., online banking providers and/or online bill payment (optionally with presentment) providers other than BPPS 1006 (e.g., other BPPS-es that partner with BPPS 1006)

Via issuer 512.

In one or more embodiments, the small business 502 registers via a web site or application that the small business already uses (e.g., accounting and/or bookkeeping software) and responds to a prompt or query regarding the opportunity to eliminate incoming check payments and participate in the service offered by BPPS-CPC 504, at which time the business voluntarily provides the payment card account number for the account the business would like to have credited.

Whether registration is direct with BPPS-CPC 504 or via one or more partners, various registration mechanisms can be employed; for example, via a form, web site, or use of on-file information (from issuer e.g.) that was already gathered as part of a registration process for registration of the payment card per se. New API 509, according to aspects of the invention, is discussed below and can be used for registration in one or more embodiments.

Figure 6:
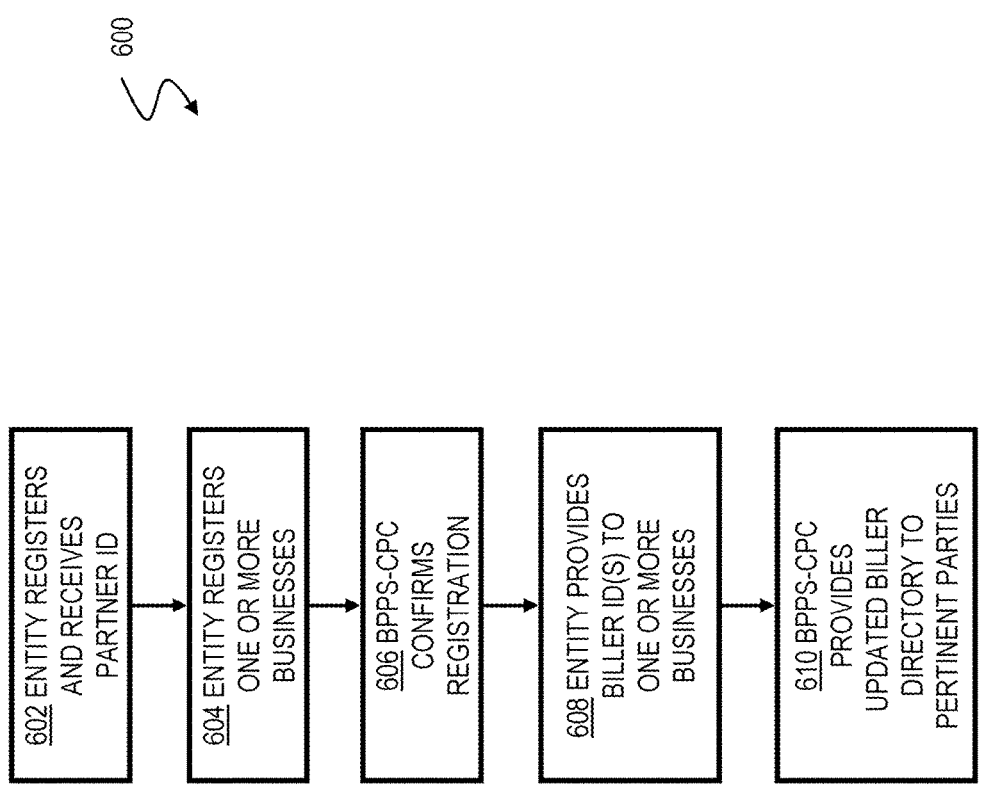
FIG. 6 presents a flow chart of registration in accordance with an aspect of the invention.

FIG. 6 presents a flow chart 600 of registration in accordance with an aspect of the invention. In optional step 602, any suitable third-party entity as discussed with regard to FIG. 5 (e.g., aggregator), which entity has a relationship with one or more (e.g., small) businesses, registers with MasterCard for online bill payment services as a partner, and receives a partner ID. This step can be omitted when third party(ies) are not employed. In step 604, this suitable entity offers electronic payments to one or more small businesses with which it has a relationship, and registers one or more of the small businesses with MasterCard for online bill payment services; for example, via new real-time application program interface (API) 509, in accordance with one or more aspects of the invention, or via a batch process. Note that an aggregator or other third party is not required in all instances, and in some cases, interaction is directly with MasterCard as seen at 508. The information gathered during registration includes, for example, business name, address, contact information (e.g., e-mail, telephone, fax, physical address, post office address), and information regarding an account for receiving payments (a bank account as in a conventional case or a payment card account). The small business is assigned a unique Biller ID by the suitable entity or MasterCard (or by MasterCard or the suitable entity accepting a small business-generated Biller ID such as an e-mail address or the like).

In step 606, MasterCard confirms that the small business has been registered in the Biller Directory 797 discussed below and provides the confirmed Biller ID to the suitable entity, as appropriate, using the aforementioned real-time API or batch process. It will be appreciated that uniqueness of the Biller ID is significant in one or more embodiments, to distinguish small businesses with similar names—e.g., "Joe's Landscaping" in New York versus "Joe's Landscaping" in St. Louis. In step 608, the suitable entity provides the Biller ID to the small business, which in turn provides the Biller ID to its customers in order to allow them to make on-line bill payments. For example, the Biller ID can be included on the invoice. In step 610, which can be thought of as part of the registration process, or as a separate publication process, MasterCard provides the updated Biller Directory, including the information for the newly-registered small business, to originators such as online banking providers, financial institutions, payment processors, non-financial retail payment providers, and the like, via a batch file or a real-time API that allows a banking provider to do a real-time lookup based on Biller ID, biller name, and the like.

Figure 7:
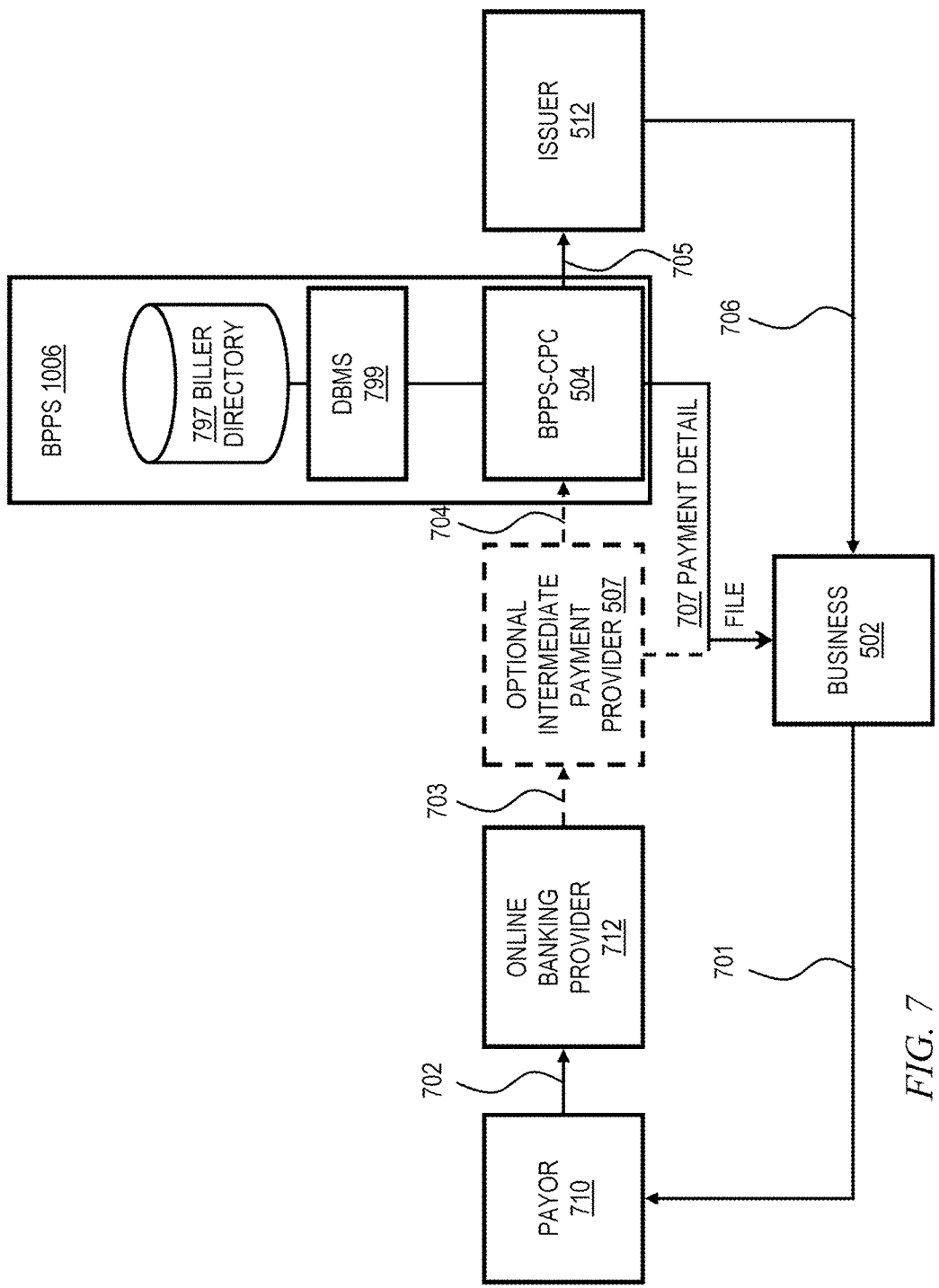
FIG. 7 depicts a high-level flow of payment, according to an aspect of the invention.

Referring now to FIG. 7, in step 701, (e.g., small) business 502, which registered as described with respect to FIGS. 5 and 6, sends an invoice (e.g., by mail or an electronic invoice via e-mail or on-line banking), including its Biller ID, to its business or consumer customer (payor) 710. In step 702, customer (payor) 710 desires to pay the invoice and so accesses an on-line banking provider or the like 712, discussed further below, and provides the appropriate payment instructions. In step 703, these instructions are routed through optional intermediate payment provider 507, which is partnered with on-line banking provider or the like 712 and/or operator of BPPS 1006. In step 704, the instructions are routed from optional intermediate payment provider 507 to BPPS-CPC 504. In an alternative approach, optional intermediate payment provider 507 is dispensed with and steps 703 and 704 are collapsed to the payment instructions being routed from on-line banking provider or the like 712 to BPPS-CPC 504. In any case, the transaction is recognized as one requiring electronic payment via BPPS-CPC 504, and thus the instructions are routed to BPPS-CPC 504, which accesses the biller directory 797. Such access can be, for example, by using database management system (DBMS) 799 to query biller directory 797 for the record(s) associated with the Biller ID included in the payment instructions. The BPPS-CPC 504 retrieves the corresponding payment card account to which payment is to be made, and submits a special payment card transaction of the kind described above to that payment card account, as seen in step 705, via a payment card network such as network 2008 (e.g., MasterCard BANKNET, VISANET, or other networks discussed herein). The issuer 512 of the payment card account of the small business 502 then deposits funds in that account in step 706, in real time. By way of summary and provision of additional detail, in one or more embodiments, the payor 710 simply advises the system to pay a certain amount to the payee. When the payment instruction is received, the BPPS 1006 access biller directory 797 via DBMS 799 and determines that this particular payor desires to be paid via the aforementioned special payment card transaction. BPPS 1006 is in the role of the merchant in a conventional payment card transaction, and initiates the special payment card transaction via communication with a suitable acquirer, which could be, for example, online banking provider 712, another bank, the combined acquirer/issuer in a three-party scenario, or the like. In some instances, BPPS 1006 itself acts as an acquirer processor, such that BPPS 1006 has the TMIP 2012 on its premises; nevertheless, an underlying acquiring bank is named in appropriate messaging. In one or more embodiments, card information is not shared with online banking provider 712.

One or more embodiments advantageously allow payment routing to cards without knowing the recipient's payment card account number, using the Biller Directory 797.

Banking provider or the like 712 can include, for example, online banking functionality. Element 712 is broadly representative of some type of bill payment interface or service used by the payor 710; e.g., traditional on-line banking, a mobile wallet provider (e.g., mobile money wallet such as Apple Pay), a third party service such as Western Union, or the like. In another aspect, payment via an ordinary payment card or a procurement card (p-card or purchasing card) can be supported.

Figure 8:
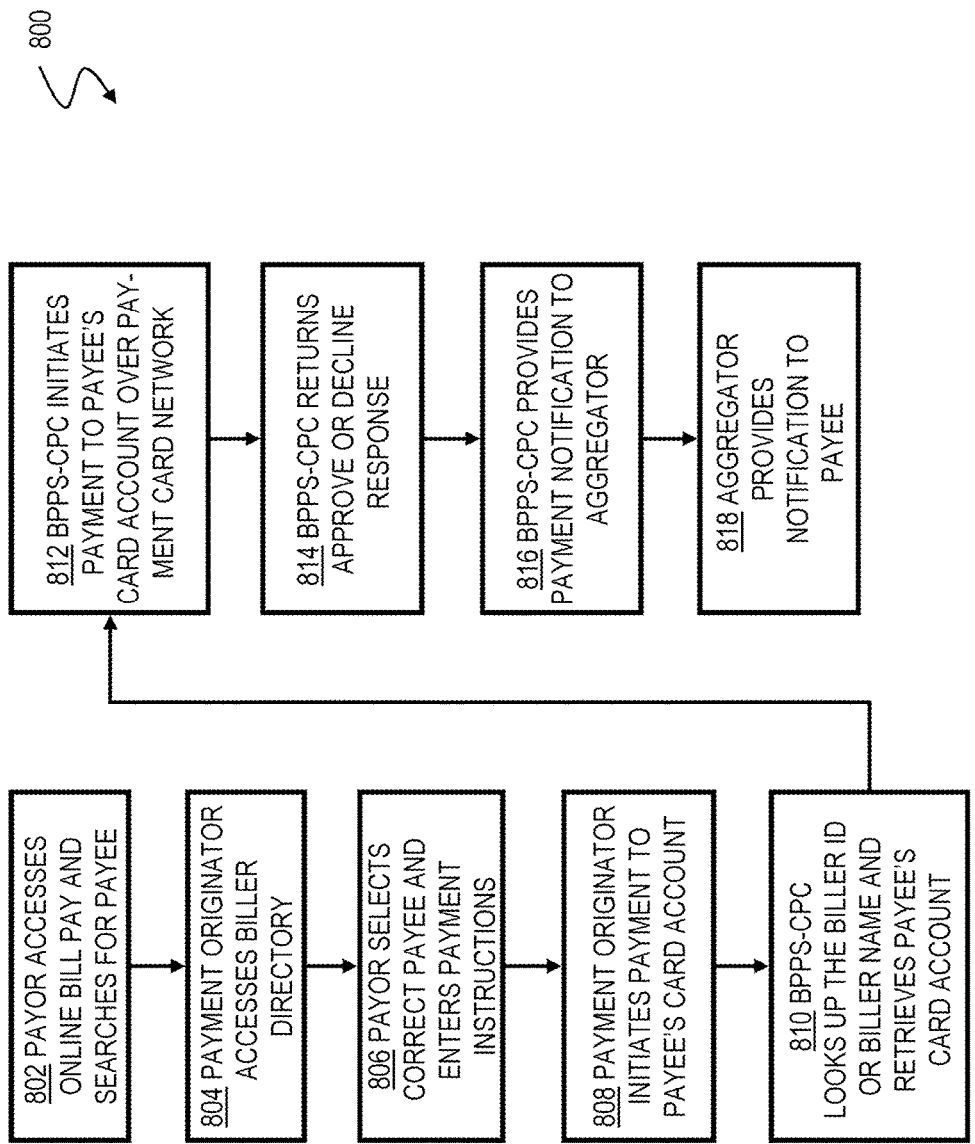
FIG. 8 presents a flow chart of exemplary detailed steps in a payment process, in accordance with an aspect of the invention.

Consider now flow chart 800 of FIG. 8, which depicts exemplary detailed steps in a payment process, in accordance with an aspect of the invention. In step 802, the payor 710 authenticates to the online bill payment application at his or her bank, selects the online bill payment functionality, and selects an option to pay a bill from a new biller (the payee 502). The payor 710 can search for the payee (business) 502 by, for example, Biller ID, biller name, and/or biller address. In step 804, the payment originator searches a local database pre-populated with billers from MasterCard, or uses MasterCard's real time API to return a list of billers including the Biller ID, biller name and address, and payment delivery time. Regarding the payment delivery time, this feature informs the payor how long it will take for the payment to be delivered. Payments to a payment card of a merchant, in accordance with one or more embodiments, are typically implemented in real time, or at least on the same day, seven days a week, as opposed to ACH payments which typically require at least two business days. This real time or same day aspect is advantageous for payments that are overdue or approaching overdue status.

In step 806, the payor 710 selects the correct biller (payee) from the returned list of billers, views the earliest delivery date, and enters the payment instructions, including the amount to pay. In step 808, the payment originator initiates a payment with MasterCard via a real-time API or batch file and provides the Biller ID, amount, sender's name, and sender's account number and/or invoice number. In step 810, MasterCard looks up the Biller ID, biller name, or other suitable identifying information in a directory (e.g., 797) and retrieves the receiving payment card account for business 502. In step 812, assuming the payee is a business such as business 502, which has registered a payment card account for receiving payments, MasterCard initiates a payment to the card account over a suitable payment card processing network, such as network 2008 (e.g., BANKNET, VISANET, or the like).

In step 814, MasterCard returns an "approve" or "decline" response back to the on-line banking provider or the like 712, via a batch or real time API. In step 816, MasterCard optionally provides a payment notification to the aggregator or other third party partner via a new MasterCard API or an existing batch process. This payment notification includes the sender's name, sender's account number and/or invoice number, amount, and timestamp (date and time). In step 818, the aggregator notifies the business 502 in real time (e.g., via e-mail, text messaging, or in a transaction report) that the sender 710 has made a payment; this notification includes, for example, the time, date, and amount. As noted above, not all embodiments utilize an aggregator; in some cases interaction is directly with BPPS-CPC 504. See discussion of payment detail file 707 below.

For example, suppose a small painting contractor is utilizing an electronic invoicing application; the contractor accesses the electronic invoicing application on his or her smart phone and bills a homeowner $500 for painting a house. The homeowner can pay the invoice for $500 on-line and the small painting contractor receives real-time notification of payment via e-mail or text.

In one or more embodiments, BPPS-CPC 504 provides small businesses with faster receipt of payments and reconciliation of payments to improve cash flow and operational efficiencies. It allows small businesses to:
- Create and send invoices on the go using BPPS-CPC 504's service or the business' existing tools;
- Allow customers to pay the way the customers choose (no need to shift consumer behavior);
- Collect real time guaranteed payments directly to the business' Commercial Debit Card account instead of receiving a paper check;
- Benefit from automatic reconciliation that matches the payment to the invoice; and/or
- Obtain real-time notifications for when payments are received from the small business' customer.

Furthermore, in one or more embodiments, automatic payment reminders are sent for unpaid invoices.

Consider a typical customer experience with one or more embodiments. A small business learns about the service provided by the BPPS-CPC 504. The small business signs up for the service on a web site associated with the BPPS-CPC 504; for example, by entering information associated with the small business and selecting appropriate options. Options include, for example, whether it is desired to receive payments via ACH or by crediting a payment card account; whether invoicing is to be manual, electronic (e.g., e-mail), or via online banking (e.g., presentment functionality of an electronic BPPS). The small business will also enter the appropriate details associated with its chosen method of receiving payment (e.g., card account number, or bank account number and routing transit number (RTN)). The sign-up is then confirmed, the card account or bank account is linked to the biller directory 797, and the small business is assigned its Biller ID. In some instances, the small business is identified by a QR code or other one- or multi-dimensional bar code which can be included on its invoices.

The small business may then invoice one of its customers using, for example, a smart phone (more generally, mobile) application. Consider that a landscaper might visit a customer's home while the customer is at work; complete the weekly landscaping work; create an invoice on the landscaper's mobile application, and then e-mail the invoice to the customer.

The consumer may then pay for the business' services using on-line banking. For example, the consumer receives the e-mail from the landscaper, reviews the invoice details, logs onto an online banking site, and enters the landscaper's name into the biller lookup function. When the correct biller is returned, the consumer confirms same, enters the amount, and selects "make payment." The financial institution offering online bill payment to the consumer debits the consumer's account and then initiates a transaction to a suitable BPPS. The landscaper receives funds in real time into his commercial payment card account. Optionally, the landscaper receives an SMS message, e-mail, or other indication of payment.

The small business may then match payment to invoices and view its income. For example, the small business may download a payment details file 707 from the BPPS-CPC 504 (directly or from optional entity 507 when present). This file can then be uploaded into an accounting package, allowing payments to be validated against invoices. One or more embodiments can provide multiple payment details file formats for compatibility with multiple popular accounting packages.

Consider that in one or more embodiments, network partners can be used to initiate payments that settle to a merchant's commercial debit card account. Exemplary funding sources include mobile wallets, bank accounts, and payment card accounts of the payor. Channels include in-person, online, and mobile. Payment initiators include acquirers, retail banks, and treasury banks. In one or more embodiments, such initiators access a suitable BPPS with a biller directory 797 which in turn provides services such as payment routing, transaction details, and electronic or manual invoicing. The BPPS causes payment to the merchant's payment card account via "special" Transaction Type (DE3sfl)="28" functionality as described above, or similar functionality.

Note that in step 808 of FIG. 8, the payment originator initiates a payment to a Payee which payment is ultimately sent to the Payee's card account; however, the skilled artisan will appreciate that in one or more embodiments, the card account is secret and not communicated to the originator—BPPS 1006 looks up the card account in biller directory 797 based on Biller ID or the like.

Currently in the US, a biller directory within MasterCard RPPS is used to route bill payments electronically instead of the payment being cut to check. Today, treasury banks aggregate large business accounts and make account information available to payment providers. This is the only way businesses can participate in the directory today. Treasury banks have not found it worthwhile to aggregate small businesses.

When small businesses register either directly with BPPS-CPC 504 or through their existing back office solution such as accounting, bookkeeping, and/or customer relationship management software, they can enjoy the same benefits as large billers, such as online banking bill presentment, faster, guaranteed payments, and payment detail reports for easy payment reconciliation. By entering into appropriate agreements with suitable third-party companies to offer BPPS-CPC services, an existing Biller Directory can be quickly augmented.

Real-time, guaranteed payments are delivered using special transactions as described above to Commercial Debit Card accounts. Payments are posted to the business' account on authorization which provides the real-time payments capability. Special transactions as described above are irrevocable and the same as cash which eliminates the headaches of following up on customers' bounced check payments.

The Payment Provider initiates a payment using a BPPS such as RPPS to the small business including Biller ID, account #, and invoice #. The BPPS such as RPPS uses the Biller ID to look up the business' account information in the Biller Directory 797 or the like and then routes the payment to the business' card account real-time.

Some embodiments offer a direct to merchant solution by partnering with an entity that operates a BPPS 1006 and/or a payment card network 2008 with an entity that provides simple electronic invoicing.

One or more embodiments provide one or more of the following benefits:
- Ability to create and send invoices
- Ability to get paid faster from customers while allowing customers to pay the way they choose
- Every payment is automatically matched to the invoice Real-time notifications are provided when payments are received from customers Auto payment reminders are sent for unpaid invoices Ability to track incoming cash-flow position in real-time.

Embodiments of the invention can be used in many different contexts. One or more embodiments are believed to be particularly useful for small businesses that have these characteristics (although this is not a limitation):

Generally a service based business

Receives payments after services are delivered

Invoices its customers

Receives paper check payments.

Non-limiting examples of customers include:

Healthcare

Day care

Small home/business service providers—landscapers, repairmen, cleaning services.

In addition to providing value for small businesses, one or more embodiments also provide value for one or more of the following parties:

1. Payment Providers: For example, Retail Banks and Third Party Payment Services that print and mail checks today because they don't have information regarding how to route the payments electronically, will benefit from moving to electronic payments to payment cards. Additionally, payment providers can offer new services in accordance with aspects of the invention to their customers while adding new businesses to the biller directory.
2. Commercial Debit Issuers: Debit Issuers who serve small businesses that process check payments deposited by their customers can benefit from better ways to serve the needs of their small business customers.
3. Consumers: Consumers who make payments with a bill payment provider utilizing BPPS-CPC 504 can make payments faster to companies, since the payments are made electronically instead of waiting 5 days for a check to be printed and mailed. This service is made available to consumers in one or more embodiments and is transparent to the consumer.

A small business' lifeblood relies on getting paid quickly and doing so with an efficient process. The business' valuable time and resources need to focus on growing the business, not on time consuming tasks like creating and sending invoices, chasing down customers for payments and manually reconciling payments to invoices.

BPPS-CPC 504 increases the speed of the payment collection process and accessing income. With a simple registration process, businesses can deliver bills electronically and get paid electronically in real time to accelerate cash flow, reduce operational costs, create billing and payment efficiencies by providing automatic invoice reconciliation, and improve customer's overall payment experience. This service requires no technology integration, is cost effective, is easy to use and provides flexibility that allows customers to pay their bills.

One or more embodiments provide Simple Sign-up and Set-up. For example, in one or more embodiments:

There are two set-up options—voice tutorial with step by step instruction, or an easy question and answer format.

Business can create one or more invoice templates with its own customized logo, add drop down lists for common used goods and services, set its own payment terms, and choose from a list of common invoice layouts.

Determine preferences for customer payment reminder alerts, notifications when customers pay the business, customize "thank you—payment received" customer notifications and cash-flow summary and detail reporting notifications.

Work with the business' existing bank account with its current financial institution.

One or more embodiments feature ease of use. For example, in one or more embodiments:

Business can easily send an invoice immediately after the goods and services are delivered. Sending an invoice takes less than 30 seconds (a non-limiting exemplary value).

Solution easily integrates with businesses contact list to quickly find the customer email address.

Easy access is provided to both summary and detailed information on work performed but not invoiced, unpaid invoices, and paid invoices.

It is easy to change the business' preferences including invoice templates, logos, payment terms, modifying a drop down list for common goods and services, alerts, and notifications.

Access is available from the business' personal computer (PC), laptop, or smart devices (tablets or smartphones), giving the business control over invoices and payments anytime, anywhere, on any device.

There is compatibility with business' current bookkeeping method—making integration with business' existing systems and process easy through simple import and export features.

One or more embodiments allow businesses to be paid faster. Consider:

Creating an invoice that is clear and easy to understand for the customer facilitates faster payment.

Sending an invoice immediately after goods and services are performed facilitates faster payment.

Setting up automatic payment reminders to customers for unpaid invoices facilitates faster payment.

Providing the convenience to customers to pay the way they desire, makes it easier for them to make payment and facilitates faster payment. In one or more embodiments, payments are automatically deposited to the business' payment card account and the business is automatically notified with summary or detailed information on each payment. Three payment methods are supported in one or more embodiments:

Link provided in the invoice email for debit and credit card and electronic check At the customer's online bank site Traditional check in the mail One or more embodiments advantageously allow a small business to save time and/or money; for example:

One or more embodiments allow businesses to instantly create and send invoices electronically rather than spending numerous hours creating invoices and mailing them.

In one or more embodiments, payment reminders are automatically sent to customers so the business does not have to spend time pursuing customers for payment.

In one or more embodiments, every payment is automatically matched against the invoices and they are marked paid. All exceptions are provided to the business in an email for easy and quick resolution.

One or more embodiments automatically generate real-time cash-flow reports on work performed but not invoiced, unpaid invoices, and paid invoices.

Consider that with traditional check payments, a check must be printed and mailed to the business; the check must be received, manually reconciled, and deposited. This might take, for example, at least 2-3 days. The check might then be in clearing for another 2-3 days. Funds may not be available to the business until 7-10 days total have elapsed, and if the check bounces, the consumer must be pursued and the entire process repeated. In one or more embodiments, payments are instant, guaranteed, and with real-time notification.

Electronic bill payments and purchases currently require two transactions to move funds from a buyer/payer to the merchant:

Transaction 1: Financial institution (FI) debits funds from the buyer/payer's account (card, demand deposit account (DDA)—e.g., checking, check, cash)

Transaction 2: FI settles funds with the merchant (check, ACH)

In one or more embodiments, BPPS-CPC 504 does not impact Transaction 1. The buyer can continue to pay however the buyer chooses: card, online banking, or walk-in. In one or more embodiments, Transaction 2 leverages the special transaction discussed above for the second leg of the transaction to settle funds to the business (which process currently happens by check and ACH).

Many small business services are available today that provide e-invoicing with card acceptance. This solves only part of the challenge businesses have in managing their accounts receivable. BPPS-CPC 504 advantageously helps small businesses get faster payments by providing guaranteed, electronic payments instead of paper checks and providing payment details to make matching invoices to payments fast and easy.

In one or more embodiments, for a direct to small business tool:

Self Service tools are provided for small businesses to serve themselves easily and effectively through online tutorial videos, guides, and quick-help links embedded in all tasks.

Automatically generated suggestions are provided based on feature use, trends, and failed tasks.

A community blog platform is provided where best practices and knowledge can be shared and problems solved between the small business users.

Periodic small business user advisor conference calls provide direct input and suggestions for the invoice and payment tool. Regular "ride along" programs are provided so that small businesses can see the tool in action, identify difficulties, and identify opportunities for enhancements.

24/7 phone based, e-mail, and instant chat support is provided for all questions and problems.

In one or more embodiments, access to BPPS-CPC 504 is provided via a web site or mobile application, and support is provided via a web portal or customer service "contact us" feature.

One or more embodiments of BPPS-CPC 504 advantageously provide the ability to receive electronic payments and payment detail files 707 regardless of how the customer pays.

Platform Development: a non-limiting exemplary embodiment integrates and extends existing components:

a. Small businesses who sign up on the web site of an electronic invoicing company can be fed into the biller directory. The system is extended to send and receive small business information from the Biller Directory and BPPS such as RPPS as well as allowing for checks to be scanned in and converted to reconciliation information, as well as using a BPPS such as RPPS to create ACH payments.

b. Existing BPPS functionality is leveraged and expanded for creating invoices and feeding small businesses into the Biller Directory.

c. The Biller Directory expands from receiving billers from issuers and/or aggregators to receiving new small business billers who sign up as per points (a) and (b) above and/or other Small Business solutions, as well as storing receiving card accounts.

d. A BPPS such as RPPS will continue to route payments based on the biller ID from the Biller Directory to the small business and provide payment details. Payment Details will be provided routed to invoicing systems to present to the small business. The platform will be extended to feed small businesses into the Biller Directory.

Thus, one or more embodiments advantageously modify existing networks (e.g., BANKNET, RPPS), platforms, and technology infrastructure to provide a novel solution in accordance with aspects of the invention. In some cases, registration is offered through trade associations and/or through retailers that cater to small businesses.

Given the discussion thus far, it will be appreciated that, in general terms, an exemplary method, according to an aspect of the invention, includes the step 604 of obtaining registration information for a plurality of businesses 502. One or more embodiments are particularly useful for small businesses, but this is not a limitation. The registration information includes, for each given one of the businesses 502, at least a name of the given one of the businesses and a payment card account number for a payment card account in which the given one of the businesses can receive payments from customers via a special payment transaction over a payment card network.

As seen in FIG. 5, registration can be direct, as shown at 508, or via a partner, as shown at 506, 510, 512. Registration can be carried out, for example, with real time API 509 connecting BPPS 1006 having BPPS-CPC 504 to one of the partners; via batch; or direct with BPPS 1006 having BPPS-CPC 504 via GUI 999 or the like. In the former case (real time API 509 connecting to one of the partners), the partner may implement a GUI for interaction with the business.

Note that regardless of whether registration is direct or via intermediaries, BPPS 1006 having BPPS-CPC 504 eventually obtains the registration information.

Again, note that examples are given with a BPPS 1006 having BPPS-CPC 504; however, not all embodiments need necessarily have presentment functionality.

A further step 704 (optionally combined into a single step with 703 when there is no intermediate payment provider 507) includes obtaining an electronic bill payment system instruction including at least an amount and a corresponding one of a plurality of previously-assigned unique biller identifiers. This instruction is obtained by BPPS 1006 having BPPS-CPC 504 from online banking provider 712, optionally via intermediary 507, and is based on communication from payor 710 to online banking provider 712. Payor 712 is a customer of one of the plurality of businesses 502 which has been assigned the corresponding one of the unique biller identifiers. This instruction can be obtained via interface functionality 995 which BPPS uses to receive electronic bill payment system instructions from entities such as 712 and/or 507.

An even further step (e.g., 810) includes accessing a biller directory 797 including the registration information and the unique biller identifiers, based on the corresponding one of the unique biller identifiers in the electronic bill payment system instruction, to retrieve the payment card account number for the payment card account for the one of the plurality of businesses 502 which has been assigned the corresponding one of the unique biller identifiers. This step can be carried out, for example, by using DBMS 799 to query directory 797.

Yet a further step (e.g., 812) includes initiating a payment to the one of the plurality of small businesses 502 which has been assigned the corresponding one of the unique biller identifiers, for the amount, via the special payment transaction over the payment card network, to the payment card account for the one of the plurality of small businesses which has been assigned the corresponding one of the unique biller identifiers, based on the retrieved payment card account number. This can be carried out by using payment card network interface 997 to send an appropriate message into payment card network 2008 or another payment card network (e.g., BANKNET, VISANET, PIN Debit networks such as NYCE, and the like).

It is worth repeating that while one or more embodiments make use of both an electronic bill payment system such as BPPS 1006 and a payment card network such as 2008, the skilled artisan will appreciate that the two are conceptually different things. "Payment card network" has been defined above. An electronic payment bill payment system such as BPPS 1006 allows people to specify payments to billers, typically settled by ACH type transfers from a deposit account. Pertinent formats, familiar to the skilled artisan, include NACHA ACH CCD, CCD+, CTX, RPPS proprietary format, and Visa ePay proprietary format.

Note that US Patent Application Publication 2010-0100480 A1 of Theresa Altman et al. (expressly incorporated herein by reference in its entirety for all purposes) discloses an innovative technique for allowing users of an electronic payment bill payment system to pay billers using payment card accounts of the payors not the billers, by sending a non-financial message through the electronic payment bill payment system, including the card number of the payor's card; the biller then charges the payor's card in a conventional manner. In contrast, one or more embodiments make a payment to the payment card account of the biller by having an entity such as BPPS-CPC receive an appropriate electronic bill payment system instruction, and then initiate a special payment transaction as described herein into a payment card network to make a payment to the payment card account of the biller.

Some embodiments further include the affirmative step of assigning to each one of the plurality of businesses a unique biller identifier; by MasterCard or a suitable partner, or by MasterCard or a suitable partner accepting a small business-generated unique biller identifier such as an e-mail address or the like. The assigned unique biller identifiers are stored in directory 797 together with other pertinent data, for example, and are published to the appropriate party(ies).

Thus, in one or more embodiments, an aggregator registers a small business with MasterCard via real time API 509 and the small business is afforded an option to receive payments to the small business' payment card account via a special transaction as described herein. The Biller ID is provided back in real time via the API, or if generated by the small business, a confirmation that the ID is acceptable provided back in real time via the API.

Further, in one or more embodiments, the payor can see how long payment will take; many payments are instantaneous or nearly so; small businesses who want to receive card payments via a special transaction will be in the biller directory 797; when payment is dispatched, MasterCard will notify an aggregator via the new API and then the aggregator notifies the small business.

In some instances, as noted above, the step of obtaining the registration information for the plurality of businesses includes an electronic bill payment system operator obtaining the information directly. In some cases, the electronic bill payment system operator generates at least a portion of the plurality of unique biller identifiers.

In some instances, as noted above, the step of obtaining the registration information for the plurality of businesses includes an electronic bill payment system operator obtaining the information indirectly from a third party partner. In some cases, the third party partner generates at least a portion of the plurality of unique biller identifiers.

In some embodiments, at least some of the pluralities of businesses generate corresponding ones of the plurality of unique biller identifiers (e.g., e-mail addresses of corresponding ones of the plurality of businesses). A mix and match approach can be taken in some instances, wherein unique biller identifiers can be generated by the electronic bill payment system operator, the third party partner(s), and/or the businesses.

In some cases, a further step includes sharing the registration information with at least one payment provider associated with the electronic bill payment system to facilitate the plurality of businesses providing the unique biller identifiers to the customers on invoices. For example, if the ID is an email address such as "payments at chesterfieldlandscaping dot com," the biller's printed or electronic invoice would say "To pay by online banking, when prompted for company identifier, pay to payments at chesterfieldlandscaping dot com." Again, to avoid inclusion of browser-executable code, the "@" sign is rendered as "at" and ".com" is rendered as "dot com."

In some instances, the payment card account for the one of the plurality of businesses includes a debit card account linked to a demand deposit account (of the business) at a financial institution.

As noted, initiating the payment via the special payment transaction can include, for example, initiating an ISO-8583 message type 0100 transaction type DE3sfl=28 message over the payment card network or initiating an ISO-8583 message type 0200 transaction type DE3sfl=28 message over the payment card network.

In another aspect, another exemplary method includes the step 604 of obtaining registration information for a plurality of businesses. The registration information includes, for each given one of the businesses, at least a name of the given one of the businesses and a specification of a payment method by which the given one of the businesses desires to receive payments from customers. The payment method may be conventional or may be a special payment transaction over a payment card network as described herein. The registration information is obtained by an electronic bill payment system (e.g., 1006 with BPPS-CPC 504) from a third party partner (e.g., 510, 506 by way of a non-limiting example) via a real-time application program interface 509. A further step 606 includes confirming registration of each given one of the plurality of businesses, from the electronic bill payment system, back to the third party partner, via the real-time application program interface.

An optional further step 816 includes providing payment notification from the electronic bill payment system, back to the third party partner, via the real-time application program interface.

Although many online bill payments are made electronically today by ACH to larger businesses, many online bill payments continue to be made by check to small and medium size businesses. Online bill payment providers mail checks to businesses when there is no bank account information available to route the bill payment electronically by ACH. Small and medium size businesses receiving check payments undergo a laborious process to process and reconcile the check payments. Due to delays in processing, some checks fail to clear, which requires the business to contact the customer to request another payment. This invention provides an instant payment mechanism utilizing the card network(s) that replaces the more costly, manual check payment process. A business registers its card account into a directory that is used to route online bill payments electronically directly into the business' account. Associated services are provided for business to register their account number, for payers to validate the payment, and for payment routing.

System and Article of Manufacture Details

Figure 10:
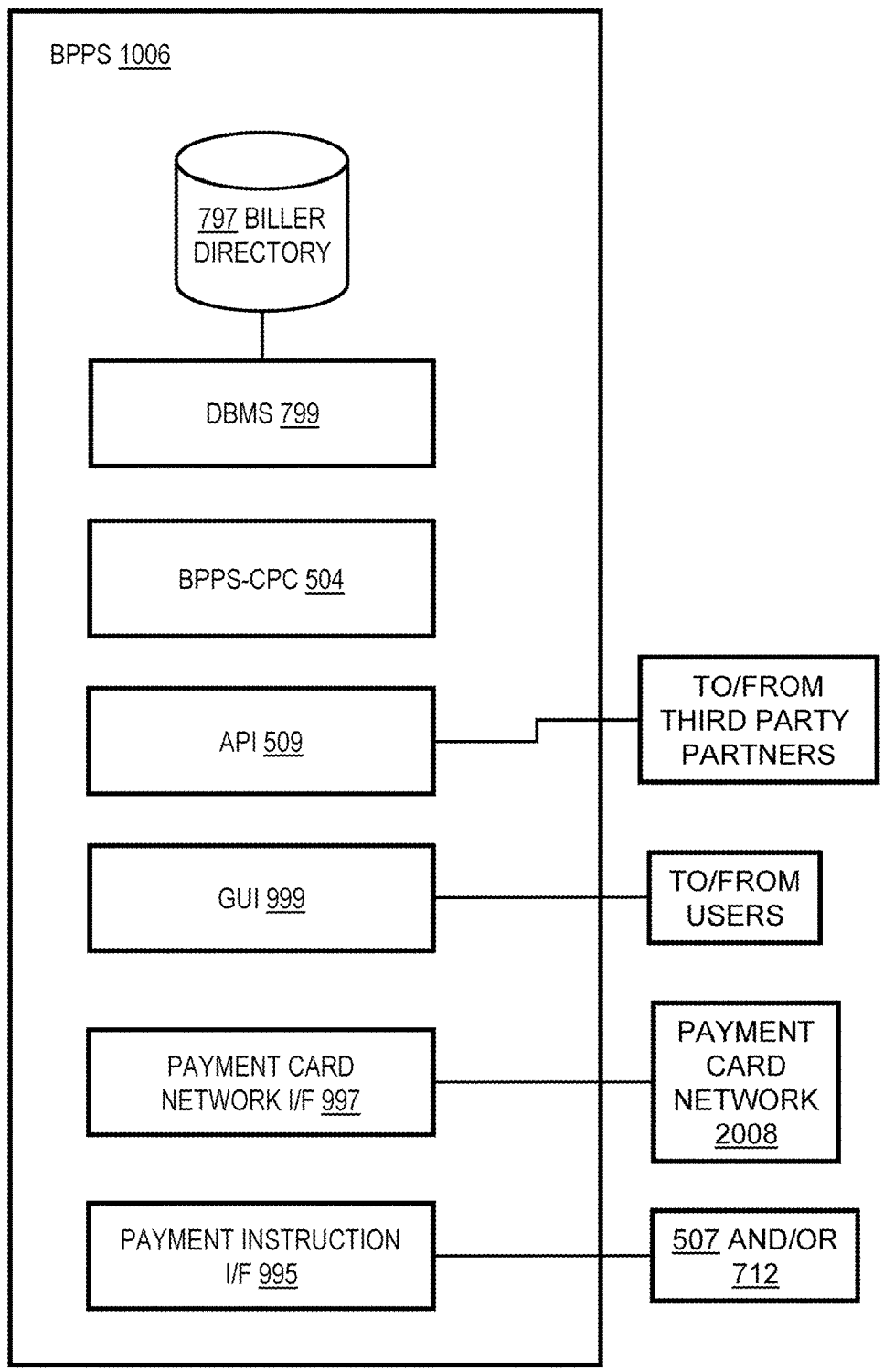
FIG. 10 is an exemplary software architecture diagram, in accordance with an aspect of the invention.

Embodiments of the invention can employ hardware and/or hardware and software aspects. Software includes but is not limited to firmware, resident software, microcode, etc. FIG. 10 presents an exemplary software architecture diagram. BPPS 1006 includes conventional bill presentment and payment functionality, as well as BPPS-CPC 504. Also included are a database management system (DBMS) 799 to access biller directory 797; novel real-time API 509 (one or more APIs) to provide an interface with third party partners; a graphical user interface (GUI) 999 to provide an interface with users (other kinds of interfaces can also be employed); and a payment card network interface 997 to interface with a payment card network such as 2008 or other payment card network. Interface 997 could be a front end communications processor such as a MASTERCARD INTERFACE PROCESSOR™ or MIP™ processor (trademarks of MasterCard International, Inc. of Purchase, N.Y.). The user interface can be implemented, for example, via a user interface module. The module can include a graphical user interface (GUI), such as that formed by a server (e.g., system 900 discussed below) serving out hypertext markup language (HTML) code to a browser of a user (system 900 is also representative of a computing device of a user). Also included in one or more embodiments is a payment instruction interface 995 which receives electronic bill payment system instructions from entities 712 and/or 507.

Software might be employed, for example, in connection with one or more of BPPS 1006 and its components; a terminal 122, 124, 125, 126; a reader 132; a host, server, and/or processing center 140, 142, 144 (optionally with data warehouse 154) of a merchant, issuer, acquirer, processor, other third party described herein, or operator of a network 2008; and the like. Firmware might be employed, for example, in connection with payment devices such as cards 102, 112, as well as reader 132.

Figure 9:
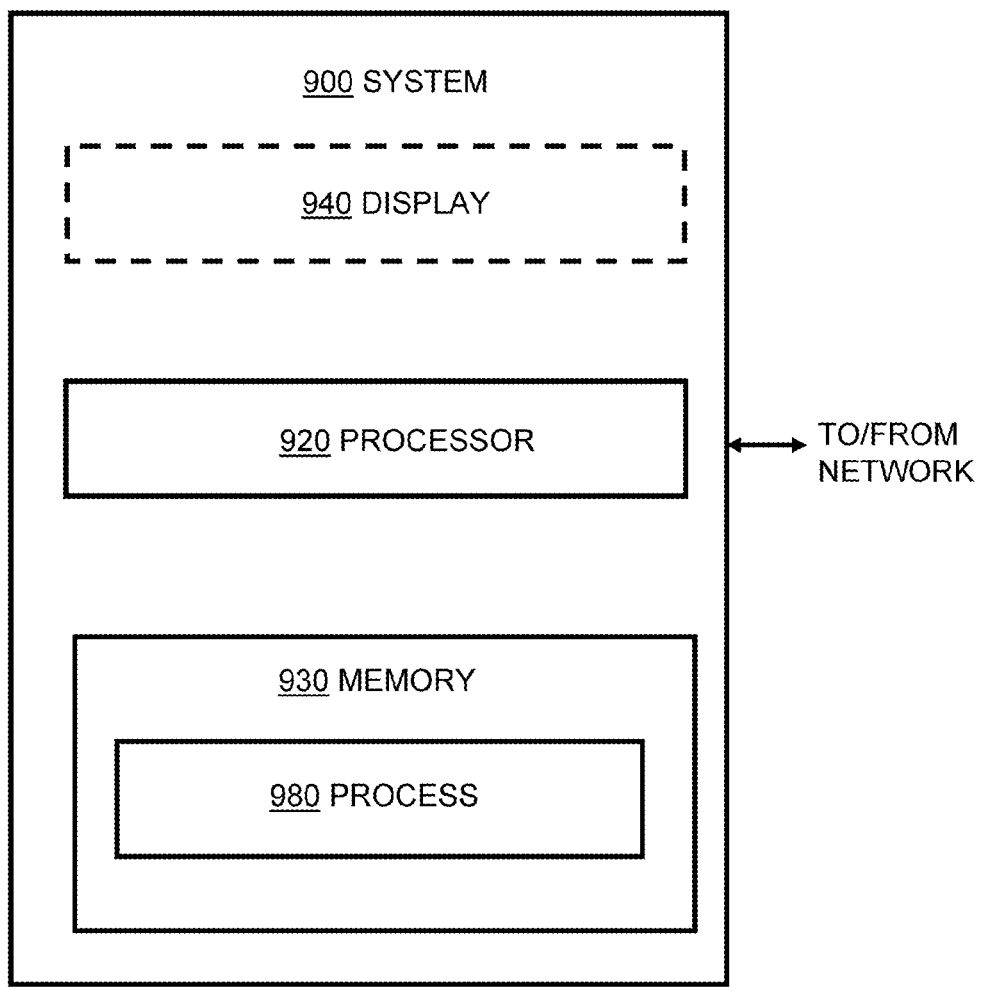
FIG. 9 is a block diagram of an exemplary computer system useful in one or more embodiments of the invention.

FIG. 9 is a block diagram of a system 900 that can implement part or all of one or more aspects or processes of the invention. As shown in FIG. 9, memory 930 configures the processor 920 (which could correspond, e.g., to processor portions 106, 116, 130; a processor of a terminal or a reader 132; processors of remote hosts in centers 140, 142, 144; processors of hosts and/or servers implementing BPPS 1006 and its components; processors of hosts and/or servers of other parties described herein; and the like); to implement one or more aspects of the methods, steps, and functions disclosed herein (collectively, shown as process 980 in FIG. 9). Different method steps can be performed by different processors. The memory 930 could be distributed or local and the processor 920 could be distributed or singular. The memory 930 could be implemented as an electrical, magnetic or optical memory, or any combination of these or other types of storage devices (including memory portions as described above with respect to cards 102, 112). It should be noted that if distributed processors are employed, each distributed processor that makes up processor 920 generally contains its own addressable memory space. It should also be noted that some or all of computer system 900 can be incorporated into an application-specific or general-use integrated circuit. For example, one or more method steps could be implemented in hardware in an ASIC (application specific integrated circuit) or FPGA (field programmable gate array) rather than using firmware. Display 940 is representative of a variety of possible input/output devices (e.g., displays, printers, keyboards, mice, touch screens, touch pads, and so on). Furthermore, system 900 is also generally representative of a mobile device such as a tablet or "smart" phone, in which case input/output will typically be via a touch screen (possibly with a small keyboard) and communications to and from a network will be via cellular telephone or Wi-Fi connection.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on one, some, or all of elements 122, 124, 125, 126, 140, 142, 144, 2004, 2006, 2008, 2010; on a computer implementing BPPS 1006 and its components; on processors of hosts and/or servers of other parties described herein; and the like. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 2004, 2006, 2008, 2010; a computer implementing BPPS 1006 and its components; on processors of hosts and/or servers of other parties described herein; and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 900 as shown in FIG. 9) running a server program. It will be understood that such a physical server may or may not include a display, keyboard, or other input/output components. A "host" includes a physical data processing system (for example, system 900 as shown in FIG. 9) running an appropriate program.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. Referring again to FIG. 10, in one or more embodiments, the modules include a database module 799 accessing a biller directory 797 stored in persistent storage, a BPPS-CPC module to implement BPPS-CPC 504, a GUI module to implement GUI 999; a module or modules with code to implement one or more APIs, and/or one or more modules implementing conventional BPPS functionality (omitted from FIG. 10 to avoid clutter). The database module can include, for example, a (relational, graphical, or other) database management system (DBMS) 799 which provides access to database 797 via queries and the like. A MIP is a front-end communications processor that is placed on-site at a MasterCard customer's facility by MasterCard for the purpose of providing access to the BANKNET telecommunication network. A MIP is a special case of a TMIP. When interface 997 is implemented as a MIP, for example, it may be on a separate hardware processor from BPPS 1006 and may communicate therewith via a suitable network. Appropriate software modules may run on the MIP. Note that in at least some embodiments, since transactions are initiated to the BPPS which submits transactions on BankNet, VisaNet or other payment card network, a MIP at a customer is not needed. In some cases, software modules and/or a network interface card or the like are provided on the same machine as BPPS 1006 to interface with the payment card network. The method steps can, in any event, be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Thus, aspects of the invention can be implemented, for example, by one or more appropriately programmed general purpose computers, such as, for example, servers, mobile devices, or personal computers, located at one or more of the entities in the figures, as well as within the payment network 2008 and/or payment system 1006. Such computers can be interconnected, for example, by one or more of payment network 2008, another VPN, the Internet, a local area and/or wide area network (LAN and/or WAN), via an EDI layer, and so on. Note that element 2008 represents both the network and its operator. The computers can be programmed, for example, in compiled, interpreted, object-oriented, assembly, and/or machine languages, for example, one or more of C, C++, Java, Visual Basic, COBOL, Assembler, Structured Query Language (SQL), and the like (an exemplary and non-limiting list), and can also make use of, for example, Extensible Markup Language (XML), known application programs such as relational database applications (e.g., IBM DB2® software available from International Business Machines Corporation, Armonk, N.Y., US; SAS® software available from SAS Institute, Inc., Cary, N.C., US), spreadsheets (e.g., MICROSOFT EXCEL® software available from Microsoft Corporation, Redmond, Wash., US), and the like. The computers can be programmed to implement the logic and/or data flow depicted in the figures. In some instances, messaging and the like may be in accordance with the International Organization for Standardization (ISO) Specification 8583 Financial transaction card originated messages—Interchange message specifications and/or the ISO 20022 or UNIFI Standard for Financial Services Messaging, also incorporated herein by reference in its entirety for all purposes. In one or more embodiments, some messages may be in accordance with NACHA Automated Clearing House (ACH) rules and regulations.

Although illustrative embodiments of the invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
   obtaining by an API registration information for a plurality of businesses, said registration information including, for each given one of said businesses, at least a name of said given one of said businesses and a payment card account number for a payment card account in which said given one of said businesses can receive payments from customers via a special payment transaction over a payment card network;
   obtaining, by a bill presentment and payment system card payment component (BPPS-CPC) of an electronic bill presentment and payment system, an electronic bill payment system instruction including at least an amount and a corresponding one of a plurality of previously-assigned unique biller identifiers, said electronic bill payment system instruction being based on a communication from one of said customers via said electronic bill presentment and payment system, said one of said customers being a customer of one of said plurality of businesses which has been assigned said corresponding one of said unique biller identifiers;

accessing, by said bill presentment and payment system card payment component (BPPS-CPC), using a database management system, a biller directory of said electronic bill presentment and payment system, said biller directory including said registration information and said unique biller identifiers, based on said corresponding one of said unique biller identifiers in said electronic bill payment system instruction, to retrieve said payment card account number for said payment card account for said one of said plurality of businesses which has been assigned said corresponding one of said unique biller identifiers; and initiating, by said bill presentment and payment system card payment component (BPPS-CPC), via a payment card network interface, a payment to said one of said plurality of businesses which has been assigned said corresponding one of said unique biller identifiers, for said amount, via said special payment transaction over said payment card network, to said payment card account for said one of said plurality of businesses which has been assigned said corresponding one of said unique biller identifiers, based on said retrieved payment card account number.

2. The method of claim 1, wherein said step of obtaining said registration information for said plurality of businesses comprises an electronic bill payment system operator obtaining said information indirectly from a third party partner.

3. The method of claim 2, further comprising said third party partner generating at least a portion of said plurality of unique biller identifiers.

4. The method of claim 1, further comprising at least some of said plurality of businesses generating corresponding ones of said plurality of unique biller identifiers.

5. The method of claim 4, wherein in said step of said at least some of said plurality of businesses generating said corresponding ones of said plurality of unique biller identifiers, at least some of said plurality of unique biller identifiers comprise e-mail addresses of corresponding ones of said plurality of businesses.

6. The method of claim 1, further comprising sharing said registration information with at least one payment provider associated with said electronic bill payment system to facilitate said plurality of businesses providing said unique biller identifiers to said customers on invoices.

7. The method of claim 1, wherein, in said step of accessing said biller directory based on said corresponding one of said unique biller identifiers to retrieve said payment card account number, said payment card account for said one of said plurality of businesses comprises a debit card account linked to a demand deposit account at a financial institution.

8. The method of claim 1, wherein said step of initiating said payment to said one of said plurality of businesses via said special payment transaction comprises initiating an ISO-8583 message type 0100 transaction type DE3sfl=28 message over said payment card network.

9. The method of claim 1, wherein said step of initiating said payment to said one of said plurality of businesses via said special payment transaction comprises initiating an ISO-8583 message type 0200 transaction type DE3sfl=28 message over said payment card network.

10. The method of claim 1, wherein:

said step of obtaining said electronic bill payment system instruction is carried out by said bill presentment and payment system card payment component (BPPS-CPC) using a payment instruction interface module executing on at least one hardware processor;

said step of accessing said biller directory is carried out by said bill presentment and payment system card payment component (BPPS-CPC) using a database management system module executing on said at least one hardware processor; and said step of initiating said payment is carried out by said bill presentment and payment system card payment component (BPPS-CPC) using a payment network interface processor.

11. An apparatus comprising:

a memory;

at least one processor operatively coupled to said memory; and a persistent storage device operatively coupled to said memory and storing in a non-transitory manner instructions which when loaded into said memory cause said at least one processor to be operative to:

obtain by an API registration information for a plurality of businesses, said registration information including, for each given one of said businesses, at least a name of said given one of said businesses and a payment card account number for a payment card account in which said given one of said businesses can receive payments from customers via a special payment transaction over a payment card network;

implement a bill presentment and payment system card payment component (BPPS-CPC) of an electronic bill presentment and payment system, which obtains an electronic bill payment system instruction including at least an amount and a corresponding one of a plurality of previously-assigned unique biller identifiers, said electronic bill payment system instruction being based on a communication from one of said customers via said electronic bill presentment and payment system, said one of said customers being a customer of one of said plurality of businesses which has been assigned said corresponding one of said unique biller identifiers;

access, by said implemented bill presentment and payment system card payment component (BPPS-CPC) of said electronic bill presentment and payment system, using a database management system, a biller directory including said registration information and said unique biller identifiers, based on said corresponding one of said unique biller identifiers in said electronic bill payment system instruction, to retrieve said payment card account number for said payment card account for said one of said plurality of businesses which has been assigned said corresponding one of said unique biller identifiers; and initiate, by said implemented bill presentment and payment system card payment component (BPPS-CPC) of said electronic bill presentment and payment system, via a payment card network interface, a payment to said one of said plurality of businesses which has been assigned said corresponding one of said unique biller identifiers, for said amount, via said special payment transaction over said payment card network, to said payment card account for said one of said plurality of businesses which has been assigned said corresponding one of said unique biller identifiers, based on said retrieved payment card account number.

12. The apparatus of claim 11, wherein at least some of said plurality of unique biller identifiers comprise e-mail addresses of corresponding ones of said plurality of businesses.

13. The apparatus of claim 11, wherein said persistent storage device further stores in said non-transitory manner further instructions which when loaded into said memory cause said at least one processor to be further operative to share said registration information with at least one payment provider associated with said electronic bill payment system to facilitate said plurality of businesses providing said unique biller identifiers to said customers on invoices.

14. The apparatus of claim 11, wherein said payment card account for said one of said plurality of businesses comprises a debit card account linked to a demand deposit account at a financial institution.

15. The apparatus of claim 11, wherein said at least one processor is operative to initiate said payment to said one of said plurality of businesses via said special payment transaction by initiating an ISO-8583 message type 0100 transaction type DE3sfl=28 message over said payment card network.

16. The apparatus of claim 11, wherein said at least one processor is operative to initiate said payment to said one of said plurality of businesses via said special payment transaction by initiating an ISO-8583 message type 0200 transaction type DE3sfl=28 message over said payment card network.

17. The apparatus of claim 11, wherein:
said instructions on said persistent storage device comprise a payment instruction interface module and a database management system module;
said at least one processor is operative to obtain said electronic bill payment system instruction with said implemented bill presentment and payment system card payment component (BPPS-CPC) component (BPPS-CPC) of said electronic bill presentment and payment system using said payment instruction interface module;
said at least one processor is operative to access said biller directory with said implemented bill presentment and payment system card payment component (BPPS-CPC) component (BPPS-CPC) of said electronic bill presentment and payment system using said database management system module.

18. A non-transitory computer readable medium comprising computer executable instructions which when executed by a computer cause the computer to perform the method of:
obtaining by an API registration information for a plurality of businesses, said registration information including, for each given one of said businesses, at least a name of said given one of said businesses and a payment card account number for a payment card account in which said given one of said businesses can receive payments from customers via a special payment transaction over a payment card network;
implement a bill presentment and payment system card payment component (BPPS-CPC) of an electronic bill presentment and payment system, which obtains an electronic bill payment system instruction including at least an amount and a corresponding one of a plurality of previously-assigned unique biller identifiers, said electronic bill payment system instruction being based on a communication from one of said customers via said electronic bill presentment and payment system, said one of said customers being a customer of one of said plurality of businesses which has been assigned said corresponding one of said unique biller identifiers;
accessing by said implemented bill presentment and payment system card payment component (BPPS-CPC) of said electronic bill presentment and payment system, using a database management system, a biller directory including said registration information and said unique biller identifiers, based on said corresponding one of said unique biller identifiers in said electronic bill payment system instruction, to retrieve said payment card account number for said payment card account for said one of said plurality of businesses which has been assigned said corresponding one of said unique biller identifiers; and
initiating by said bill presentment and payment system card payment component (BPPS-CPC) of said electronic bill presentment and payment system, via a payment card network interface a payment to said one of said plurality of businesses which has been assigned said corresponding one of said unique biller identifiers, for said amount, via said special payment transaction over said payment card network, to said payment card account for said one of said plurality of businesses which has been assigned said corresponding one of said unique biller identifiers, based on said retrieved payment card account number.

* * * * *